US 7,555,476 B2

(12) United States Patent
Holbrook

(10) Patent No.: US 7,555,476 B2
(45) Date of Patent: *Jun. 30, 2009

(54) APPARATUS AND METHODS FOR ORGANIZING AND/OR PRESENTING DATA

(75) Inventor: David M. Holbrook, Houston, TX (US)

(73) Assignee: Kool Torch, L.L.C., Houston, TX (US)

( * ) Notice: Subject to any disclaimer, the term of this patent is extended or adjusted under 35 U.S.C. 154(b) by 197 days.

This patent is subject to a terminal disclaimer.

(21) Appl. No.: 11/378,190

(22) Filed: Mar. 17, 2006

(65) Prior Publication Data

US 2006/0161535 A1    Jul. 20, 2006

Related U.S. Application Data

(63) Continuation of application No. 11/129,938, filed on May 16, 2005, now Pat. No. 7,054,870, which is a continuation of application No. 10/002,793, filed on Nov. 15, 2001, now Pat. No. 6,961,731.

(60) Provisional application No. 60/248,802, filed on Nov. 15, 2000.

(51) Int. Cl.
G06F 7/00     (2006.01)
G06F 17/30    (2006.01)

(52) U.S. Cl. ............... 707/3; 707/5; 707/7; 707/104.1; 705/26; 705/37; 715/205; 715/700; 715/763; 715/836

(58) Field of Classification Search .............. None
See application file for complete search history.

(56) References Cited

U.S. PATENT DOCUMENTS

| 5,295,243 | A | * | 3/1994 | Robertson et al. | ........... 715/848 |
| 5,987,469 | A | * | 11/1999 | Lewis et al. | ................ 707/102 |
| 6,601,061 | B1 | * | 7/2003 | Holt et al. | ...................... 707/3 |
| 6,769,010 | B1 | * | 7/2004 | Knapp et al. | ................ 709/203 |
| 6,879,332 | B2 | * | 4/2005 | Decombe | ..................... 715/764 |
| 6,980,982 | B1 | * | 12/2005 | Geddes et al. | .................. 707/3 |
| 7,168,034 | B2 | | 1/2007 | Hennings et al. | |
| 7,493,315 | B2 | | 2/2009 | Holbrook | |
| 7,523,114 | B2 | | 4/2009 | Seamon | |
| 2002/0046131 | A1 | | 4/2002 | Boone et al. | |
| 2006/0112003 | A1 | | 5/2006 | Levy et al. | |

* cited by examiner

*Primary Examiner*—Greta L Robinson
*Assistant Examiner*—James J Wilcox
(74) *Attorney, Agent, or Firm*—E. Randall Smith; Jones & Smith, LLP

(57) ABSTRACT

In some embodiments, a method of displaying a plurality of search results from a search of at least one data source includes providing a distinct image for each of the plurality of search results and displaying at least some of the images in distinct initial groups based upon at least one common characteristic of the members of each group. Upon selection of at least one initial group, at least some of the images of the selected group(s) are displayed in distinct sub-groups based upon a common characteristic of the members of each respective sub-group.

19 Claims, 40 Drawing Sheets

26- Central Valley Classic Cars
Classic cars, street rods, muscle cars, roadsters, hot rods, convertibles, exotic cars, antique cars and speciality cars for sale in California
*http://www.classicshowroom.com*
Shopping: Vehicles: Autos: Classic      ╱─ 503
    ╱─ 901   ╱─ 902        *Auctions: Autos*
33- Astra Motor Cars                          ╱─ 903
Selection of cars that are rebuildable, salvaged, used, wrecked, repairable, auctioned, repossessed, damaged, race and track, and ready to go.
*http://astramotorcars.com/*
Shopping: Auctions: Autos      ╱─ 503
    ╱─ 901   ╱─ 902    *Recreation and Hobbies: Models*
8- K and R Replicas                              ╱─ 903
Model Cars, builts, and kits. Mostly European and British cars and racing models. Online ordering and worldwide shipping
*http://www.kandrreplicas.co.uk/*
Shopping: Recreation and Hobbies: Models: Cars

10- BN Slots
Slot cars from Fly, Ninco, Strombecker, Scalextric, SCX, and antique slot cars. Order online.
*http://bnslots.com*
Shopping: Recreation and Hobbies: Models: Slot Cars

16- Larrys Performance R/C's
Kits and replacement parts for most radio control cars. (Does not work with Netscape)
*http://www.clickmarket.net/serviet/nnt.pagegen.intro?NS=T&PM=F&s=MID0000246*
Shopping: Recreation and Hobbies: Models: Radio Control: Cars and Trucks

27- TAG's Massive Models
On-line model store: R/C cars, planes, boats, model railways, and slot cars.
*http://www.tagmodels.co.uk*
Shopping: Recreation and Hobbies: Models

*FIG. 9B*

1001 — Reset Top Status Variable

1002 — Standard Subroutines

1003a — Initialize Global Variables

1003b — Sub link1
  Software code to render
  user interface #1
  in either Graphical or
  Text style.
End Sub 1003b — Sub link2
  Software code to render
  user interface #2
  in either Graphical or
  Text style.
End Sub

⋮

1003b — Sub linkn
  Software code to render
  user interface #n
  in either Graphical or
  Text style.
End Sub 1004 — Reload Frame #2 and
Set Top Status to "ok1"

*FIG. 10*

```
1301 <html>
1302 <head>
1303 <SCRIPT LANGUAGE="vbscript">
1304 Top.Status=""
1305 </SCRIPT>
1306 <SCRIPT LANGUAGE="vbscript" SRC="/ktsubs.vbs"></SCRIPT>
1307 <SCRIPT LANGUAGE="vbscript">
1308 Dim capray(50)
1309 Dim textray(50)
1310 Dim linkray(50)
1311 Dim catray(50)
1312 Dim dotindx(50)
1313 Dim xray(50)
1314 Dim yray(50)
1315 capray(1)="#1 - Andy´s <b>Cars</b>"
1316 textray(1)="A site with loads and loads of different <b>cars</b>
       and they all feature statistics, movies, and pictures."
1317 linkray(1)="http://www.homestead.com/andys_cars/andys_Cars.html"
1318 catray(1)="Recreation: Autos"
1319 capray(2)="#2 - Schumacher Racing"
1320 textray(2)="Schumacher is world known for there popular touring
       <b>cars</b> and off-road buggies."
1321 linkray(2)="http://www.racing-cars.com/"
1322 catray(2)="Recreation: Models: RC: RC Cars"
```

*FIG. 13A*

1323 capray(3)="#3 - Model Car Gallery International -->(hosted by <b>CARS</b>, Chattanooga Auto Replicas in Scale)"
1324 textray(3)="  - <b>CARS</b> is a model car club that was developed to promote the craft of building and detailing model <b>cars</b> and trucks regardless of skill level, age or experience.This web site also features an international model car gallery with hundreds of<b>cars</b>in 30 different categories."
1325 linkray(3)="http://www.carsmodelcargallery.com/"
1326 catray(3)="Recreation: Models: Scale: Cars"
1327 capray(4)="#4 - Ronnie Cowan Specialist <b>Cars</b>."
1328 textray(4)="Marcos sports <b>cars</b> and performance <b>cars</b>."
1329 linkray(4)="http://www.specialist-cars.demon.co.uk/"
1330 catray(4)="Regional: Europe: United Kingdom: Business and Economy: Motoring: Dealers"
1331 capray(5)="#5 - Sprintcars Racing Down Under Australia"
1332 textray(5)="Dirt Track Racing Down Under in Australia - Sprint <b>Cars</b> & All other sort of racing <b>cars</b> on Dirt Track..."
1333 linkray(5)="http://www.inselfdefense.net/speedwaycity"
1334 catray(5)="Sports: Auto Racing: Sprint Cars"

*FIG. 13B*

1401 <SCRIPT LANGUAGE="vbscript">
1402 if (Top.frame2.History.Length=0) then
1403 Top.frame2.Document.hform.Submit
1404 else
1405 if (Top.Status="ok2") then
1406 Top.frame2.Document.hform.Submit
1407 end if
1408 end if
1409 Top.Status="ok1"
1410 </SCRIPT>

*FIG. 14*

```
1501 <html>
1502 <body>
1503 <DIV ID="overDiv" STYLE="position:absolute; visibility:hide; z-
     index:101;"> </DIV>
1504 <SCRIPT LANGUAGE="JavaScript" SRC="/overlib.js"></SCRIPT>
1505 <form name="hform" method="GET" action="/cgi-bin/sublink.exe">
1506 <input type="hidden" name="sub" value="1">
1507 <input type="hidden" name="style" value="0">
1508 </form>
1509 <form name="hform1" method="GET" action="/cgi-bin/sublink.exe">
1510 <input type="hidden" name="sub" value="1">
1511 <input type="hidden" name="style" value="1">
1512 </form>
1513 <SCRIPT LANGUAGE="vbscript">
1514 If (Top.Status = "ok1") Then
1515 Call parent.frame1.link1(0)
1516 Else
1517 Top.Status = "ok2"
1518 End If
1519 </SCRIPT>
1520 </body>
1521 </html>
```

*FIG. 15A*

```
1501  <html>
1502  <body>
1503  <DIV ID="overDiv" STYLE="position:absolute; visibility:hide; z-
      index:101;"></DIV>
1504  <SCRIPT LANGUAGE="JavaScript" SRC="/overlib.js"></SCRIPT>
1505  <form name="hform" method="GET" action="/cgi-bin/sublink.exe">
1506  <input type="hidden" name="sub" value="1">
1507  <input type="hidden" name="style" value="1">
1508  </form>
1509  <form name="hform1" method="GET" action="/cgi-bin/sublink.exe">
1510  <input type="hidden" name="sub" value="1">
1511  <input type="hidden" name="style" value="0">
1512  </form>
1513  <SCRIPT LANGUAGE="vbscript">
1514  If (Top.Status = "ok1") Then
1515  Call parent.frame1.link1(1)
1516  Else
1517  Top.Status = "ok2"
1518  End If
1519  </SCRIPT>
1520  </body>
1521  </html>
```

*FIG. 15B*

```
18000   Sub link12(style)
18001   call OutputHeader("cars","Shopping","Shopping/","#0000FF", 11,
        4, 50, 0,style)
18002   call OutputRing( 3, 335, 442, 105, style)
18003   call OutputOval( 4, 335, 442, 0, 0,"","Sports: Auto Racing",
        1,"Sports","cars","#0000FF","93",5, style)
18004   doti(1)=50
18005   xray(1)=0
18006   yray(1)=-32
18007   call OutputDots( 1, 4, 335, 442, 1,"#E6FFFF","#0000FF",style)
18008   call OutputRing( 0, 202, 515, 150, style)
18009   call OutputOval( 4, 202, 515,  2, 8,"<br>1. <b>Autos</b>
        <br>2.<b>Directories</b>","Vehicles", 5,"Vehicles","cars",
        "#0000FF","50", 69,style)
18010   doti(1)=7
18011   xray(1)=0
18012   yray(1)=-37
18013   doti(2)=9
18014   xray(2)=28
18015   yray(2)=-28
18016   doti(3)=11
18017   xray(3)=18
18018   yray(3)=32
18019   doti(4)=12
18020   xray(4)=-18
18021   yray(4)=32
18022   doti(5)=26
18023   xray(5)=-28
18024   yray(5)=-28
18025   call OutputDots( 5, 4, 202, 515, 1,"#E6FFFF","#0000FF",style)
```

*FIG. 18A*

| | |
|---|---|
| 18026 | call OutputRing( 2, 333, 608, 110, style) |
| 18027 | call OutputOval( 4, 333, 608, 0, 0,"","Auctions: Autos", 1,"Auctions","cars","#0000FF","72",11, style) |
| 18028 | doti(1)=33 |
| 18029 | xray(1)=0 |
| 18030 | yray(1)=-32 |
| 18031 | call OutputDots( 1, 4, 333, 608, 1,"#E6FFFF","#0000FF",style) |
| 18032 | call OutputRing( 1, 197, 700, 120, style) |
| 18033 | call OutputOval( 4, 197, 700, 3, 9,"\<br\>1. \<b\>Cars\</b\>\<br\>2. \<b\>Slot Cars\</b\>\<br\>3. \<b\>Radio Control \</b\>" ,"Recreation and Hobbies: Models", 4,"Recreation and Hobbies","cars","#0000FF","65",15,style) |
| 18034 | doti(1)=8 |
| 18035 | xray(1)=-18 |
| 18036 | yray(1)=-32 |
| 18037 | doti(2)=10 |
| 18038 | xray(2)=18 |
| 18039 | yray(2)=-32 |
| 18040 | doti(3)=16 |
| 18041 | xray(3)=18 |
| 18042 | yray(3)=32 |
| 18043 | doti(4)=27 |
| 18044 | xray(4)=-18 |
| 18045 | yray(4)=32 |
| 18046 | call OutputDots( 4, 4, 197, 700, 1,"#E6FFFF","#0000FF",style) |
| 18047 | End Sub |

*FIG. 18B*

*Open Directory - Search Results - Microsoft Internet Explorer*

File  Edit  View  Favorites  Tools  Help

Back  Forward  Stop  Refresh  Home | Search  Favorites  History | Mail  Print  Edit Address  http://search.dmoz.org/cgi-bin/search?search=cars    GoJLinks"

Open Directory Categories (1-5 of 500)
1. Recreation: Autos (<u>236 matches</u>)
2. Shopping: Vehicles: Autos (<u>69</u>)
3. Shopping: Antiques and Collectibles: Toys and Games: Cars and Trucks (<u>82</u>)
4. Shopping: Vehicles: Parts and Accessories (<u>89</u>)
5. Regional: Oceania: New Zealand: Business and Economy: Travel Services: Car Rentals (<u>59</u>)
[more...]

Open Directory Sites (1-20 of 5000)
1. <u>Andy's Cars</u>- A site with loads and loads of different cars and they all feature statistics, movies, and pictures. ␣1902  ␣1904
 --<u>http://www.homestead.com/andys_cars/andys_Cars.html</u> <u>Recreation: Autos (5)</u>␣1905
2. <u>Schumacher Racing</u>- Schumacher is world known for their popular touring cars and off-road buggies.
 --<u>http://www.racing-cars.com/</u> <u>Recreation: Models: RC: RC Cars (24)</u>
3. <u>Model Car Gallery International</u>--(hosted by CARS, Chattanooga Auto Replicas in
 <u>Scale</u>)-- CARS is a model car club that was developed to promote the craft of building
 and detailing model cars and trucks regardless of skill level, age, or experience. This
 web site also features an international model car gallery with hundreds of cars in 30 different categories.
 --<u>http://www.carsmodelcargallery.com?</u> <u>Recreation: Models: Scale: Cars (69)</u>

```
catray(1)="Recreation: Autos: Enthusiasts: Kit Cars"
catray(2)="Recreation: Models: Scale: Cars"
catray(3)="Recreation: Models: RC: RC Cars"
catray(4)="Regional: Europe: United Kingdom: England: Suffolk: Ipswich:
           Business and Economy: Shopping: Cars"
catray(5)="Sports: Auto Racing: Sprint Cars"
catray(6)="Sports: Auto Racing: Touring Cars"
catray(7)="Shopping: Vehicles: Autos: Internet Sales"
catray(8)="Shopping: Recreation and Hobbies: Models: Cars"
catray(9)="Shopping: Vehicles: Directories"
catray(10)="Shopping: Recreation and Hobbies: Models: Slot Cars"
catray(11)="Shopping: Vehicles: Autos: Parts and Accessories: European Cars"
catray(12)="Shopping: Vehicles: Autos: Parts and Accessories: American Cars"
catray(13)="Recreation: Autos: Enthusiasts: Exotic Cars"
catray(14)="Sports: Auto Racing: Drag Racing"
catray(15)="Arts: Music: Bands and Artists: C: Cars, The"
catray(16)="Shopping: Recreation and Hobbies: Models: Radio Control: Cars and Trucks"
catray(17)="Home: Consumer Information: Automobiles: Advocacy and Protection"
catray(18)="Regional: Europe: United Kingdom: England: Bristol: Business
            and Economy: Shopping: Cars"
catray(19)="Arts: Genres: Automotive: Art Cars"
catray(20)="Regional: Europe: United Kingdom: Recreation and Sports:
            Sports: Motorsport: Touring Cars"
catray(21)="Regional: Europe: United Kingdom: England: Bedfordshire:
            Bedford: Business and Economy: Cars"
catray(22)="Regional: Europe: United Kingdom: Business and Economy:
            Shopping: Vehicles: Parts and Accessories"
catray(23)="Home: Consumer Information: Automobiles: Purchasing:
            By Class: Sports Cars"
catray(24)="Home: Consumer Information: Automobiles: Purchasing:
            By Class: Luxury Cars"
catray(25)="Regional: Europe: United Kingdom: England: Suffolk: Ipswich:
            Business and Economy: Shopping: Cars"
```

*FIG. 20A* catray(26)="Shopping: Vehicles: Autos: Classic"
catray(27)="Shopping: Recreation and Hobbies: Models: Slot Cars"
catray(28)="Society: Issues: Transportation: Roads, Cars and Trucks: Road Safety"
catray(29)="Recreation: Collecting: Toys: Cars and Trucks"
catray(30)="Regional: Europe: United Kingdom: England: Bristol: Business and Economy: Shopping: Cars"
catray(31)="Regional: Europe: United Kingdom: Recreation and Sports: Sports: Motorsport: Touring Cars"
catray(32)="Regional: Europe: United Kingdom: England: Bedfordshire:
        Bedford: Business and Economy: Cars"
catray(33)="Shopping: Auctions: Autos"
catray(34)="Regional: Europe: United Kingdom: England: Suffolk: Ipswich:
        Business and Economy: Shopping: Cars"
catray(35)="Recreation: Autos: Enthusiasts: Muscle Cars"
catray(36)="Business: Industries: Transportation: Auto Transport"
catray(37)="Regional: Europe: United Kingdom: England: Bristol: Business and Economy: Shopping: Cars"
catray(38)="Business: Industries: Transportation: Trucking: Truck Transport: Pilot Car Companies"
catray(39)="Regional: Europe: United Kingdom: England: Suffolk: Ipswich:
        Business and Economy: Shopping: Cars"
catray(40)="Regional: Europe: United Kingdom: Recreation and Sports: Sports: Motorsport: Touring Cars"
catray(41)="Regional: Europe: United Kingdom: England: Bedfordshire: Bedford:
        Business and Economy: Cars"
catray(42)="Business: Industries: Transportation: Auto Transport"
catray(43)="Regional: Europe: United Kingdom: Business and Economy: Shopping:
        Vehicles: Parts and Accessories:
catray(44)="Recreation: Travel: Reservations: Vehicles: Car Rentals: Exotic Cars"
catray(45)="Sports: Auto Racing: Drag Racing"
catray(46)="Regional: Europe: United Kingdom: England: Bristol: Business and Economy: Shopping: Cars"
catray(47)="Society: Issues: Transportation: Roads, Cars and Trucks"
catray(48)="Regional: Europe: United Kingdom: Recreation and Sports: Sports: Motorsport: Touring Cars"
catray(49)="Regional: Europe: United Kingdom:England:Bedfordshire:Bedford: Business and Economy: Cars"
catray(50)="Shopping: Sports: Auto Racing"

*FIG. 20B*

```
2501 <html>
2502 <head>
2503 <SCRIPT LANGUAGE="vbscript">
2504 Top.Status=""
2505 </SCRIPT>
2506 <SCRIPT LANGUAGE="vbscript" SRC="/ktsubs.vbs"></SCRIPT>
2507 <SCRIPT LANGUAGE="vbscript">
2508 Sub link1(style)
2509 call OutputHeader("cars", "","","", 1728, 11, 50, 1,style)
2510 call OutputCircle( 10, 367, 332,  0, 0,"","Computers: Software: Desktop
      Customization: Wallpaper", "Computers","cars", "#99FFFF","#0000FF","198", 6, 105)
2511 call OutputCircle( 0, 204, 446, 4, 2,"<br>1. <b>Oceania</b><br>
      2. <b>Europe</b><br>3. <b>Asia</b><br>4. <b>North America
      </b>","Regional","Regional","cars","#99FF99","#009600","0", 381, 220)
2512 call OutputCircle( 9, 367, 560, 0, 0,"","Reference: Museums: Transportation:
      Automobiles", "Reference","cars", "#FFCCCC","#DC0000","65", 10, 105)
2513 call OutputCircle( 8, 146, 658, 2, 3,"<br>1. <b>Music</b><br>2.
      <b>Genres</b>","Arts","Arts","cars","#FFCCFF","#C80096","51", 6, 105)
2514 call OutputCircle( 1, 317, 765, 8, 4,"<br>1. <b>Vehicles</b><br>2.
      <b>Antiques and Collectibles</b><br>3. <b>Classifieds</b><br>4.
      <b>Recreation and Hobbies</b><br>5.<b>Sports</b><br>6. <b>
      Auctions</b><br>7. <b>Clothing</b><br>8. <b>Publications</b>
      ","Shopping", "Shopping","cars", "#FFCC99","#E16419","50", 565, 205)
2515 call OutputCircle( 7, 149, 869, 2, 5,"<br>1. <b>Issues</b><br>2.
      <b>People</b>","Society","Society","cars","#99FFFF","#0000FF","76", 14, 110)
2516 call OutputCircle( 6, 364, 973, 2, 6,"<br>1. <b>Purchasing</b><br>2.
      <b>Advocacy and Protection</b>","Home: Consumer Information: Automobiles",
      "Home","cars", "#99FF99","#009600","116", 30, 110)
2517 call OutputCircle( 2, 182, 1049, 4, 7,"<br>1. <b>Autos</b><br>2. <b>
      Models</b><br>3. <b>Collecting</b><br>4. <b>Travel</b>","Recreation",
      "Recreation","cars", "#FFCCCC","#DC0000","34", 516, 150)
```

*FIG. 25A*

2518 call OutputCircle( 5, 360, 1142, 4, 8,"<br>1. <b>Transportation</b>
<br>2. <b>Import and Export</b><br>3. <b>Arts and Entertainment
</b><br>4. <b>Manufacturing</b>","Business: Industries", "Business",
"cars","#FFCCFF","#C80096","60", 42, 120)
2519 call OutputCircle( 4, 166, 1234, 3, 9,"<br>1. <b>Simulations</b>
<br>2. <b>Racing</b><br>3. <b>Combat</b>","Games: VideoGames:
Genres: Driving and Racing", "Games","cars", "#FFCC99","#E16419","35", 24, 120)
2520 call OutputCircle( 3, 344, 1327, 8, 10,"<br>1. <b>General</b><br>2.
<b>Legend Cars</b><br>3. <b>Touring Cars</b><br>4. <b>Stock Cars
</b><br>5. <b>Drag Racing</b><br>6. <b>Sprint Cars</b><br>7.
<b>Driving Schools</b><br>8. <b>Vintage</b>","Sports: Motorsports:
Auto Racing", "Sports","cars", "#99FFFF","#0000FF","245", 53, 150)
2521 End Sub

*FIG. 25B*

26000 Sub link4(style)
26001 call OutputHeader("cars","Shopping","Shopping/","#009600", 565, 8, 50, 1,style)
26002 call OutputCircle( 6, 333, 392, 0, 0,"","Publications: Books: Vehicles: Autos",
"Publications","cars", "#99FF99","#009600","108", 7, 105)
26003 call OutputCircle( 0, 205, 471, 3, 14,"<br>1. <b>Autos</b><br>2.
<b>Parts and Accessories</b><br>3. <b>Directories</b>","Vehicles",
"Vehicles","cars","#99FF99","#009600","50", 260, 150)
26004 call OutputCircle( 7, 333, 560, 0, 0,"","Clothing: Casual: T-Shirts: Cars",
"Clothing","cars", "#99FF99", "#009600","93", 1, 105)
26005 call OutputCircle( 5, 190, 648, 0, 0,"","Auctions: Autos", "Auctions","cars",
"#99FF99","#009600","72", 11,105)
26006 call OutputCircle( 2, 326, 726, 2, 15,"<br>1. <b>Auto Racing</b>
<br>2. <b>Golf</b>","Sports", "Sports", "cars","#99FF99","#009600","19", 87, 120)
26007 call OutputCircle( 4, 190, 803, 0, 0,"","Classifieds","Classifieds","cars",
"#99FF99","#009600","109",37, 105)
26008 call OutputCircle( 1, 333, 888, 2, 16,"<br>1. <b>General</b><br>2.
<b>Pedal Cars</b>","Antiques and Collectibles: Toys and Games: Cars and Trucks",
"Antiques and Collectibles","cars", "#99FF99", "#009600", "45",94, 105)
26009 call OutputCircle( 3, 202, 961, 4, 17,"<br>1. <b>General</b><br>2.
<b>Slot Cars</b><br>3.<b>Cars</b> <br>4. <b>Radio Control</b>",
"Recreation and Hobbies: Models","Recreation and Hobbies", "cars", "#99FF99",
"#009600","29", 68, 110)
26010 End Sub

*FIG. 26*

Open Directory Categories (1-25 of 500)

(238 matches) ~2702

1. Recreation: Autos (<u>238 matches</u>)
2. Shopping: Vehicles: Autos (<u>70</u>)
3. Shopping: Antiques and Collectibles: Toys and Games: Cars and Trucks (<u>82</u>)
4. Shopping: Vehicles: Parts and Accessories (<u>89</u>)
5. Regional: Oceania: New Zealand: Business and Economy: Travel Services: Car Rentals (<u>59</u>)
6. Recreation: Models: RC: RC Cars (<u>40</u>)
7. Recreation: Models: Scale: Cars (<u>38</u>)
8. Sports: Motorsports: Auto Racing (<u>53</u>)
9. Recreation: Collecting: Toys: Cars and Trucks (<u>51</u>)
10. Recreation: Autos: Enthusiasts (<u>53</u>)
11. Shopping: Classifieds (<u>39</u>)
12. Regional: Europe: United Kingdom: Business and Economy: Motoring: Dealers (<u>39</u>)
13. Shopping: Recreation and Hobbies: Models (<u>39</u>)
14. Shopping: Vehicles: Autos: Hot Rods (<u>35</u>)
15. Regional: Europe: United Kingdom: Business and Economy: Motoring (<u>27</u>)

*FIG. 27* catray(1)="Recreation: Autos"
catray(2)="Shopping: Vehicles: Autos"
catray(3)="Shopping: Antiques and Collectibles: Toys and Games: Cars and Trucks"
catray(4)="Shopping: Vehicles: Parts and Accessories"
catray(5)="Regional: Oceania: New Zealand: Business and Economy: Travel Services: Car Rentals"
catray(6)="Recreation: Models: RC: RC Cars"
catray(7)="Recreation: Models: Scale: Cars"
catray(8)="Sports: Motorsports: Auto Racing"
catray(9)="Recreation: Collecting: Toys: Cars and Trucks"
catray(10)="Recreation: Autos: Enthusiasts"
catray(11)="Shopping: Classifieds"
catray(12)="Regional: Europe: United Kingdom: Business and Economy: Motoring: Dealers"
catray(13)="Shopping: Recreation and Hobbies: Models"
catray(14)="Shopping: Vehicles: Autos: Hot Rods"
catray(15)="Regional: Europe: United Kingdom: Business and Economy: Motoring"
catray(16)="Recreation: Autos: Enthusiasts: Muscle Cars"
catray(17)="Recreation: Autos: Enthusiasts: Kit Cars"
catray(18)="Regional: Europe: United Kingdom: Business and Economy: Travel Services: Car Rentals"
catray(19)="Games: Video Games: Genres: Driving and Racing: Simulations: Need for Speed Series"
catray(20)="Shopping: Vehicles: Parts and Accessories: European Cars"
catray(21)="Shopping: Recreation and Hobbies: Models: Slot Cars"
catray(22)="Shopping: Sports: Auto Racing: Builders - Car and Chassis"
catray(23)="Regional: Europe: United Kingdom: Business and Economy: Motoring: Buyers Guides"
catray(24)="Shopping: Sports: Auto Racing: Fan Merchandise"
catray(25)="Games: Video Games: Genres: Driving and Racing: Racing: Carmageddon Series"
catray(26)="Recreation: Autos: News and Magazines"
catray(27)="Shopping: Antiques and Collectibles: Toys and Games: Cars and Trucks: Pedal Cars"
catray(28)="Shopping: Vehicles: Parts and Accessories: Performance"
catray(29)="Recreation: Autos: Clubs"
catray(30)="Shopping: Sports: Auto Racing: Parts and Accessories"
catray(31)="Shopping: Sports: Golf: Carts"

*FIG. 28A* catray(32) = "Regional: Asia: Japan: Business and Economy: Automotive"
catray(33) = "Shopping: Recreation and Hobbies: Models: Cars"
catray(34) = "Shopping: Recreation and Hobbies: Models: Radio Control: Cars and Trucks"
catray(35) = "Shopping: Vehicles: Autos: Customized"
catray(36) = "Recreation: Collecting: Toys: Cars and Trucks: Diecast Toys"
catray(37) = "Shopping: Vehicles: Parts and Accessories: Japanese Cars"
catray(38) = "Home: Consumer Information: Automobiles: Purchasing"
catray(39) = "Shopping: Vehicles: Directories"
catray(40) = "Shopping: Sports: Auto Racing: Classifieds"
catray(41) = "Arts: Music: Bands and Artists: C: Cars, The"
catray(42) = "Recreation: Models"
catray(43) = "Regional: North America: United States: Texas: Localities: S: San Antonio: Business and Economy: Shopping: Autos"
catray(44) = "Regional: North America: United States: Oklahoma: Localities: T: Tulsa: Business and Economy: Shopping: Autos"
catray(45) = "Sports: Motorsports: Auto Racing: Legend Cars"
catray(46) = "Sports: Motorsports: Auto Racing: Touring Cars"
catray(47) = "Sports: Motorsports: Auto Racing: Stock Cars"
catray(48) = "Business: Industries: Transportation: Auto Transport"
catray(49) = "Sports: Motorsports: Auto Racing: Drag Racing: Personal"
catray(50) = "Home: Consumer Information: Automobiles: Purchasing: By Class: Sports Cars"

*FIG. 28B*

```
<xml>
  <element>
    <attribute1>Category Path of data element #1</attribute1>
    <attribute2>URL to access data element #1</attribute2>
    <attribute3>Description of data element #1</attribute3>
  </element>
  <element>
    <attribute1>Category Path of data element #2</attribute1>
    <attribute2>URL to access data element #2</attribute2>
    <attribute3>Description of data element #2</attribute3>
  </element>
  <element>
    <attribute1>Category Path of data element #3</attribute1>
    <attribute2>URL to access data element #3</attribute2>
    <attribute3>Description of data element #3</attribute3>
  </element>
       *
       *
       *
       *
       *
       *
       *
       *
       *
       *
       *
       *
  <element>
    <attribute1>Category Path of data element #n</attribute1>
    <attribute2>URL to access data element #n</attribute2>
    <attribute3>Description of data element #n</attribute3>
  </element>
</xml>
```

FIG. 30

```
<xml>
  <node>
    <attribute1>Category Path of matching leaf-node #1</attribute1>
    <attribute2>URL to access list of descriptions and URL's of matching data elements in leaf-node #1 (See Fig. 32)</attribute2>
  </node>
  <node>
    <attribute1>Category Path of matching leaf-node #2</attribute1>
    <attribute2>URL to access list of descriptions and URL's of matching data elements in leaf-node #2 (See Fig. 32)</attribute2>
  </node>
  <node>
    <attribute1>Category Path of matching leaf-node #3</attribute1>
    <attribute2>URL to access list of descriptions and URL's of matching data elements in leaf-node #3 (See Fig. 32)</attribute2>
  </node>
       *
       *
       *
       *
       *
       *
       *
       *
       *
       *
       *
       *
       *
  <node>
    <attribute1>Category Path of matching leaf-node #n</attribute1>
    <attribute2>URL to access list of descriptions and URL's of matching data elements in leaf-node #n (See Fig. 32)</attribute2>
  </node>
</xml>
```

FIG. 31

```xml
<xml>
  <element>
    <attribute1>URL to access data element #1</attribute1>
    <attribute2>Description of data element #1</attribute2>
  </element>
  <element>
    <attribute1>URL to access data element #2</attribute1>
    <attribute2>Description of data element #2</attribute2>
  </element>
  <element>
    <attribute1>URL to access data element #3</attribute1>
    <attribute2>Description of data element #3</attribute2>
  </element>
      *
      *
      *
      *
      *
      *
      *
      *
      *
      *
      *
      *
  <element>
    <attribute1>URL to access data element #nn</attribute1>
    <attribute2>Description of data element #nn</attribute2>
  </element>
</xml>
```

*FIG. 32*

APPARATUS AND METHODS FOR ORGANIZING AND/OR PRESENTING DATA

CROSS REFERENCE TO RELATED APPLICATIONS

This application is a continuation of U.S. application Ser. No. 11/129,938, filed May 16, 2005 and entitled "Apparatus and Methods for Organizing and/or Presenting Data", which issued as U.S. Pat. No. 7,054,870, which is hereby incorporated by reference herein in its entirety and which is a continuation of U.S. application Ser. No. 10/002,793, filed Nov. 15, 2001 and entitled "Apparatus and Method for Organizing and/or Presenting Data", which issued as U.S. Pat. No. 6,961,731, which is hereby incorporated by reference herein in its entirety and which claims the benefit of U.S. Provisional Patent Application Ser. No. 60/248,802, filed Nov. 15, 2000.

BACKGROUND OF THE INVENTION

The present invention relates to the organization and/or presentation of data. In some embodiments, the present invention relates to the presentation of database search results by a graphical user interface.

Many known Internet search engines, for example, accept a search request, such as a search string query, over Internet communication links from a user via a user's browser. The user's query initiates a search by a search of a database of web sites, or information about the content of various web sites, and returns "matching" web sites to the user. One such popular search engine is Yahoo.com. Internet search engines are described in U.S. Pat. No. 5,933,822 to Braden-Harder et al, issued on Aug. 3, 1999, assigned to Microsoft Corporation, entitled "Apparatus and Methods from an Information Retrieval System that Employs Natural Language Processing of Search Results to Improve Overall Precision," and which is hereby incorporated herein by reference in its entirety.

Typically, Internet search engines rank search results in numerical order based upon some relevance criteria. Search engines typically download their search results comprising a numerical ranking as a sequential textual list of matching web sites, which is subsequently displayed by the user's browser. For example, the first page of a search result may provide a numerically ordered listing of the first 10 or 20 web sites matching a user's search criteria. To view a listing of the next 10 or 20 web sites, a new page of the search results typically must be downloaded, and so on. The user typically accesses the list of the next 10 or 20 web sites by clicking on "next" icon at the bottom of the browser display page.

The textual list for each matching web site usually includes a short description of each respective web site and a "hyperlink" to the site to enable the user to access the web site. This typical prior art presentation of search results provides no further grouping of matching web sites. The numerically ordered group is presented in a textual long list. Oftentimes, the search results are altered to place certain results at the top of the list for a fee, whether or not they are most relevant to the user's query.

Some search engines are capable of searching one or more databases of web sites that include numerous categories and subcategories among which the web sites are grouped. The categories can be organized, for example, in multiple layers, or levels, each such layer or level being more specific than the previous one, such as in a hierarchical "category tree". For example, near the top level of such a tree, e.g., the first level below the root level, may contain numerous, perhaps 10 or 20 general or "parent" categories. For instance, Arts, Business, Sports, and Science may be examples of such parent categories. Each parent category may be further divided into more specific subcategories. For instance, a Sports category can be further subdivided into subcategories such as Baseball, Basketball, Football, and Hockey. Each first level subcategory can be further subdivided into even more specific (lower level) subcategories. For instance, the first level subcategory, Baseball, can be divided into second level subcategories, such as College, Fantasy, Major League, and Minor League. Some or all of the second level subcategories may be further divided into third level subcategories, and so on. This branching of the category tree continues as far as the web directory or database provides, until all categories and subcategories are included.

With the use of the category tree generally described above, each web site in the database can be assigned or has a "category path." For instance, for a search under the query "cars", a search engine may identify numerous category paths for the matching web sites that satisfy the query. The following are examples of such category paths:

SPORTS: AUTO RACING: DRAG RACING: FUNNY CARS

HOME: CONSUMERS: INFORMATION: PRODUCT REVIEWS: AUTOS

ARTS: MUSIC: BANDS AND ARTISTS: C: THE CARS

SPORTS: AUTO RACING: DRAG RACING: PERSONAL

Referring to the first exemplary category path above, the first listed term "SPORTS" is referred to herein as the "parent category", the next term "AUTO RACING" being the "first level subcategory" followed by the "second level subcategory" "DRAG RACING" and so on, each category/subcategory separated by a colon ":".

Some search engines are capable of downloading and presenting the user with the category paths associated with the matching web sites in the format of a list spanning numerous pages. This category path format provides a second conventional option for displaying search results, in addition to the aforementioned method of listing the matching web sites in numerically ranked order. Instead of presenting the user with a list of ranked web sites, this category path option presents a textual list of category paths.

Prior art search engines may combine these two search result presentation formats. For example, the first exemplary format may be incorporated into the second format with the use of a hyperlink to a listing of the matching web sites that fall within a particular category path. In one example, text, such as "5 matches found", may be shown adjacent the category path, such as "SPORTS: AUTO RACING: DRAG RACING: FUNNY CARS (5 matches found)." Selecting or clicking on the text "5 matches found" could lead to a listing of the web sites and links to the sites. Another known data presentation format lists the matching web sites of the category path directly underneath the category path name. Some existing search engines provide access to a listing of all web sites in the entire web directory that fall within a particular category path, such as by the user selecting or clicking on the category path itself.

Considering existing database search presentation, organization and navigation technology, there is a need for a data presentation and/or navigation method or apparatus that concisely presents relevant data to the user, aggregates the data elements, enables the user to efficiently evaluate and review the data, or addresses one or more other concern stated or inferred anywhere in this patent, or includes one or more feature of the present invention described or shown herein, or otherwise advances the technology of data organization, presentation or navigation.

It should be noted that the above-described prior art and the features are only examples. Merely by mentioning such example prior art features, it is not intended that each claim of this patent be limited to exclude each such feature and disadvantage. Accordingly, none of the appended claims should be limited in any way by the above discussion or construed to include or exclude the cited prior art features, except and only to the extent as may be expressly stated in a particular claim. Further, the example of Internet search engines and searching web sites is only one implementation of the present invention—the present invention can be used with any taxonomy-based, category tree or hierarchical-structured database.

SUMMARY OF THE INVENTION

In some embodiments, a method of displaying, on a monitor, screen or other viewable area, a plurality of search results from a search of at least one data source includes providing a distinct image for each of the plurality of search results. At least some of the distinct images are displayed in distinct initial groups based upon at least one common characteristic of the search results of each respective initial group. A common characteristic identifier is provided for at least one common characteristic of each respective initial group. Upon the selection of at least one initial group, at least some of the distinct images of the selected group are displayed in distinct first sub-groups based upon a common characteristic of the search results of each respective first sub-group. A common characteristic identifier is displayed for at least one common characteristic of each respective first sub-group. Upon the selection of at least one first sub-group, at least some of the distinct images of such first sub-group are displayed in distinct second sub-groups based upon a common characteristic of the search results of each respective second sub-group. A common characteristic identifier is provided for at least one common characteristic of each respective second sub-group.

In various embodiments, a method of displaying data elements indexed in at least one taxonomy-structured data source is provided. The taxonomy structure includes multiple nodes at multiple levels. The path in the taxonomy structure that leads to each data element is referred to as that data element's implied category path. Each implied category path provides at least two categories. Each consecutively listed category in an implied category path represents a different node at a lower level in the taxonomy structure of the data source(s).

The method of these embodiments includes displaying each of the first-listed categories from the implied category paths of a plurality of data elements. Upon a user selecting any displayed category, a distinct representation of at least some of the data elements having the selected category as the first-listed category in their respective implied category paths is provided. These data element representations are provided in distinct groups, each group including data elements having a common lower-level category in their respective implied category paths. The lower-level categories of each displayed group of data element representations are also provided.

Upon a user selecting any displayed lower-level category, the distinct representation of at least some of the data elements having the selected lower-level category in their respective implied category paths is provided in further distinct groups. Each such group includes data elements having a common further lower-level category in their respective implied category paths. The further lower-level categories of each displayed group of data element representations is also provided.

In many embodiments, a method of displaying search results of data elements residing in at least one data source is provided. The at least one data source has multiple hierarchically-arranged levels with at least one node at each level. Each node has a name identifying it. Each data element resides in the data source(s) at at least one node, such node being the end-node for such data element and any other data elements that reside there. Each data element has at least one implied node path representing the path of nodes through the hierarchically-arranged levels of the data source(s) that leads to the end-node of such data element. Each node path lists its respective nodes in descending order through the hierarchically-arranged levels of the data source(s) with that the last-listed node being the end node for the associated data element.

The method of these embodiments includes displaying a plurality of data elements from the search results in separate initial groups on a first web page. Each such grouping includes data elements having a common non-end node included in their respective node paths. The associated name for each non end-node for each displayed initial group is provided on the first web page. Access to each displayed data element and the ability to select at least one initial group are provided from the first web page. Upon selection of an initial group, at least some of the data element members of such group are provided in distinct first sub-groups. Each such grouping includes data elements having another common non-end node at a level in their respective node paths that is lower than the node associated with the initial grouping thereof. The associated name for each non end-node for each displayed first sub-group and access to each displayed data element are also provided.

Accordingly, the present invention includes features and advantages which are believed to enable it to advance data organization and presentation technology. Characteristics and advantages of the present invention described above and additional features and benefits will be readily apparent to those skilled in the art upon consideration of the following detailed description of preferred embodiments and referring to the accompanying drawings.

BRIEF DESCRIPTION OF THE DRAWINGS

For a detailed description of presently preferred embodiments of the invention, reference will now be made to the accompanying drawings wherein:

FIG. 10 is an illustration of an example GUI software script;

FIG. 13 illustrates an example code segment;

FIG. 14 illustrates an example code segment;

FIG. 15a illustrates an example code segment;

FIG. 15b illustrates an example code segment;

FIG. 18 illustrates an example code segment for rendering an example GUI;

FIG. 19 illustrates an example code segment for rendering an example GUI;

FIG. 20 illustrates an example code segment for rendering an example GUI;

FIG. 25 illustrates an example code segment;

FIG. 26 illustrates an example code segment;

FIG. 27 illustrates an example code segment;

FIG. 28 illustrates an example category search list;

FIG. 30 illustrates an example generic XML API

FIG. 31 illustrates an example XML;

FIG. 32 illustrates an example XML API;

DETAILED DESCRIPTION OF PREFERRED EMBODIMENTS

Figure 1:
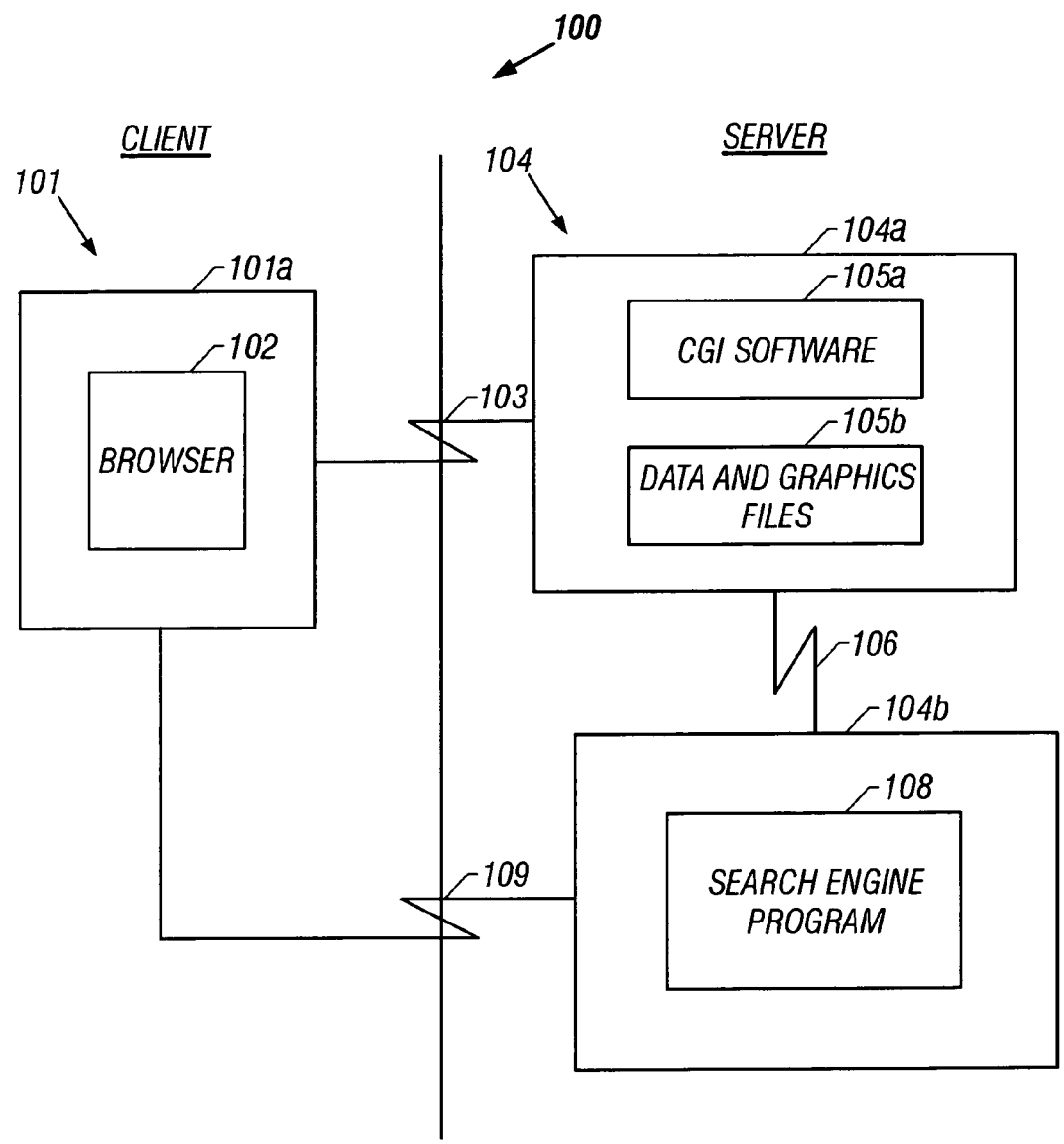
FIG. 1 is a block diagram of an example computer system.

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. For example, the following DETAILED DESCRIPTION OF PREFERRED EMBODIMENTS sections of this patent discuss non-limiting examples, or embodiments, of the invention. Such discussions and the details thereof are not intended and should not be construed to be required by any claim unless and only to the extent expressly required in the claim itself.

As used herein, the following terms have the following meanings:

The term "user" and variations thereof means one or more persons, entity or electronic media conducting a search, interested in search results or viewing search results of a database. The present invention is not and should not be limited in any way by who or what is or can be a user.

The terms "select", "clicking" and variations thereof means any action resulting in the selection of an option or variable provided to a user or depicted (such as by demarcated text or an icon) on a computer display, screen or other mechanism and can be accomplished in any suitable manner, such as without limitation by the user clicking the computer pointer device on the area of the screen where an option is displayed, by touch, by voice or by using one or more keys on the computer keyboard. The present invention is not and should not be limited in any way by the methods or mechanisms used for selecting or clicking.

The term "Internet" and variations thereof means the Internet or World Wide Web, such as described, for example, in U.S. Pat. No. 5,960,411 to Harman et al, issued on Sep. 28, 1999 and entitled "Method and System for Placing a Purchase Order Via a Communications Network", which is hereby incorporated by reference herein in its entirety. The Internet is used herein as merely an example of an information retrieval system with which the present invention can be used. The present invention can be used with any suitable information retrieval system, communications or computer network (such as a LAN or WAN) and is not and should not be limited in any way by the database, system or methods or mechanisms with which it is used.

The terms "search engine", "conventional search engine" and variations thereof mean computer programs or code, program instructions, software or other media capable of performing a search of data or making information accessible via the Internet conducted. Conventional search engines typically reside on "server" computers. A person having access to the Internet can access and use such search engines through browser, or other, software that may reside, for example, on a "client" computer. Client and server computers are connected as is known in the art, such as by communication links over the Internet. The browser or other software on the client computer is capable of sending requests to server computers and displaying web pages downloaded from server computers. There are or in the future may be other methods of accessing search engines and conducting searches on the Internet or other computer networks or information retrieval systems. This aspect is also not limiting upon the present invention or the appended claims.

The present invention includes one or more of the following features, capabilities or attributes; provides a user-friendly, intuitive graphical user interface for the presentation and review of search results from any hierarchically organized database; provides a graphical user interface (GUI) that enables the navigation of an unstructured list of data elements, e.g., search results of a database; provides data elements are classified within the leaf-nodes or intermediate nodes of a hierarchical category node tree; e.g., a library structure; provides an engine for building a GUI that utilizes only the two attributes per data element, a text string indicating the category path, and a URL for accessing the data element—if desired, a data element description or excerpt (e.g., JPEG, MPEG, or audio) may also be included; enables implementation of a simple API utilizing the aforementioned two GUI attributes; includes a GUI engine that operates independently of the library structure associated with the accessed database; includes a GUI that displays one hierarchical level at a time; presents all aggregate data elements for a displayed category with paths that are implied; displays all matching sibling category nodes at each level; any displayed category node can be "drilled-down" to the next lower hierarchical level of the category tree or "drilled out" to immediately access a data element; each category node may be presented as a circle with the node's corresponding category name; if desired, the size of the category node circle indicates the number of elements aggregate to that node, relative to the total number of data elements; the relative size of the category nodes may be linear, logarithmic or based on another relative sizing formula to enable a visualization of all displayed category nodes on a single display; the aggregate data elements of a category node are those elements that are classified within any leaf-node or intermediate level node that falls below the displayed category node in the hierarchical order; the aggregate number of data elements may also be displayed within the circle; includes a GUI that displays a subset of the list of data elements, e.g., the first 50, with the elements aggregate to a category node explicitly displayed as icons arranged in a cluster around the node's category name; category members or data elements with category icons displayed may be shape or color coded to indicate subsequent sub-categories with the displayed category icon; at any point during the GUI navigation, selecting any displayed category member icon will either display an optional element description or excerpt or enable the user to "drill-out" (access the data) on a desired element without having to completely "drill-down" (successively visit each subsequent level of the categories to access the lowest level node and data element) the GUI; downloads a program or script to generate HTML at the client to display each and every GUI graphical data presentation without having to access the server again for additional HTML instructions; provides a navigable, multi-tiered set of web pages or screens, and, if desired, also showing matching web sites or data base elements by rank number; is capable of accomplishing at least one of the following: (1) separating, categorizing and/or graphically displaying numerous web sites or data elements based upon their respective parent categories, subcategories, category paths or a combination thereof; (2) distinguishing various web sites or other data elements from each other for display on one or more web pages or screens using text, images, color coding, other methods or any combination thereof; (3) displaying representations of matching web sites or data base elements to a search query on a single web page or screen; (4) providing multiple web pages or screens showing matching web sites in different formats, such as graphically and textually, and/or in different contexts, such as in the context of parent categories and all or some levels of subcategories; (5) graphically displaying aggregate data with implied path information with drill down and drill out capability; other features evidence from the following description or the appended drawings.

Some embodiments of the present invention may be useful, for example, with any type of automated, electronic or computerized information retrieval system and any mechanism or method, such as computer program instructions or software, or other technology, for searching data accessible therewith and is not limited in any way thereby.

Some embodiments of the present invention may be useful to traverse and graphically display any hierarchical file structure, for example, Windows Explorer or a genealogical family tree. Files or data elements may comprise video, picture, text or sound. Some embodiments of the present invention may hide explicit downward path information, however, downward path information is implied and made explicit in graphical format as an option by left clicking on a category member icon and selecting a downward path option. Some embodiment of the present invention may be useful to provide advertisements within category icons to increase click through for advertisers therein.

The present invention may be advantageously applied to other uses. For example, Microsoft® Windows® visually presents computer files in a folder-subfolder format. In this format, folders and subfolders must be consecutively selected to ultimately reach the resident data files. In contrast, the present invention may be used to immediately display the same resident files, but with implied paths. Thus, the present invention may be an effective substitute or alternative to the folder-subfolder scheme. In still another application, the present invention may be configured as a software application that is used to access files such as scanned photographs. "Thumbnails" of those photographs can, for example, be shown in the pop-up menu that appears as a mouse scrolls over the category members. In still another application, the present invention may be configured as a software application that tracks and presents information relating to the genealogy of a family. For example, conventional genealogy-related software applications generate pyramid or tree shaped charts that depict the genealogical relationship between members of a family. The present invention may also be used to show genealogical relationships. The present invention could be designed to illustrate the relationship between family members without the clutter of intermediate family members; i.e., all the great-grand children of a person may be shown can be shown without showing the children and grandchildren of that person (of course, those family members are the "implied paths").

FIG. 1 is a block diagram illustrating the overall general computer configuration of one embodiment of the present invention. It should be understood that the present invention is not limited in any way to the following description or any particular computer configuration. Further, the hardware and/or software and/or other apparatus or medium used to practice the present invention in no way limits the present invention. The server side 104 of the exemplary computer network 100 of FIG. 1 includes one or more server computer systems 104*a* or other hardware capable of storing and allowing operation of Common Gateway Interface (CGI) computer software 105*a* as well as the storage of various data files 105*b* for retrieval by the client's browser 102, according to the present invention, and one or more server computer systems 104*b* or other hardware for storing and allowing the operation of a search engine computer program 108. Path 106 indicates a network connection between the CGI software 105*a* and the search engine program 108, such as via the Internet as is or becomes known in the art. Any other suitable hardware for storing, allowing the operation and intercommunication of the CGI software 105*a* and search engine 108 may be used.

The client side 101 (where the user operates) of this embodiment includes browser computer software 102, such as Microsoft Internet Explorer 4.0, operating on a typical computer system 101*a*. The browser program 102 is capable of receiving web pages from and sending requests to the server side 104. The computer system 101*a* of this embodiment can be any system suitable for use with the browser software. For example, the computer system 101*a* may include one or more of various input devices and capabilities, such as a keyboard, pointer device, touch screen and/or voice activated mechanisms. The pointer device can be a mouse, track ball, touch screen, cursor, control key(s) and/or any other input mechanism or method that is or becomes known in the art. The computer system 101*a* of this embodiment also includes a monitor with a screen display and a processor, such as a CPU. The processor may, for example, be a general purpose processor or a special purpose processor with image processing capabilities. The system 101*a* may also include any among various types of internal memory, including RAM and ROM, and/or external storage, such as disks, CD ROMs, ASICs, external RAM or external ROM.

The server and client sides 104, 101 of FIG. 1 interact as is or becomes known in the art, such as via conventional communications lines or links 103 and 109 over the Internet or some other communication path to any search engine and database. The user preferably accesses the CGI software 105*a* or search engine 108 with the browser 102 via the Internet by conventional methods and with the use of computer hardware and software, or other devices or methods, as is or become known in the art.

The CGI software 105*a* of this particular embodiment may be written in any computer language suitable for interaction with a search engine computer program 108 and browser 102 over the Internet, such as Visual Basic. The search engine 108 can be a conventional statistical based Internet search engine, as described above, or any other computer software or program instructions capable of interacting with the user, e.g., via CGI software 105*a* and a browser 102 as described herein. One example of a search engine 108 that the present invention can be used with is the search engine located at URL address "www.dmoz.org." However, any suitable search engine computer program that is or becomes known can be used with this embodiment.

The CGI software 105*a* and search engine 108 can be made accessible to the user in any suitable manner. For example, the browser 102 can be connected with the CGI software 105*a* and search engine 108 by the user connecting with the Internet and inputting, calling or selecting a URL address designated for the CGI software 105*a*.

Figure 2:
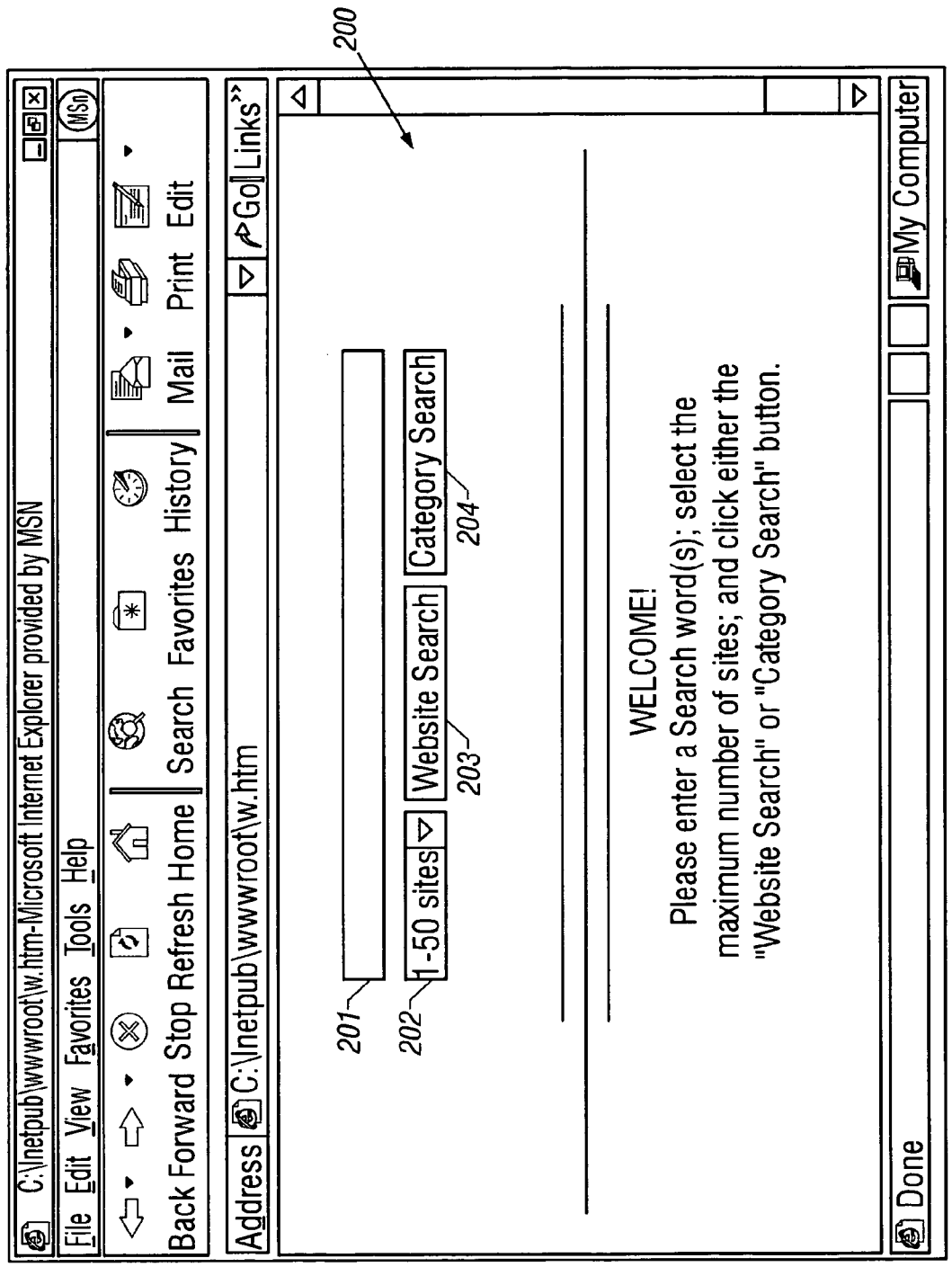
FIG. 2 is an illustration of an example short screen.

FIG. 2 shows an example of a start screen, or front page, 200 that could appear on the user's computer screen, such as by being downloaded from the server computer 104*a* to the browser 102 of FIG. 1 after the user accesses the URL address which points to the server computer 104*a* and downloads the front page file which is one of the files indicated by 105*b*. The user can interact with the front page 200 and provide input or select among various options. For example, the front page 200 can include a search query text area 201 where the user can enter a search string query, such as by typing in the key words to be searched. Any other suitable format or method for entering, inputting or selecting a search request with or without a front page 200 can be used.

The front page 200 can include other features or user options, such as a search quantity window 202 in which the user indicates the quantity of matching web sites from the search to be displayed or recovered. For example, the window 202 in this particular embodiment shows two textual alternatives from which the user selects, either the first numerically ranked matching "1-50 sites", "1-100 sites" (not shown) or "all" (not shown), per search to be displayed. Different quantities of search results or a different format or mechanism for determining the number of matching web sites to be presented can be used. Further, other or different information can be requested on the front page 200, which can have any desirable format.

Still with reference to the embodiment of FIG. 2, after entering information in area 201 and selecting the quantity from window 202, the user can have the search executed, such as by selecting the text, or button, "Website Search" 203, or positioning the user's computer pointer over the text "Website Search" 203 and clicking, as is conventionally known. Alternatively, the user can select the text, or button, "Category Search" 204, or positioning the user's computer pointer over the text "Category Search" 204 and clicking, as is conventionally known. In this embodiment, selecting either the text "Website Search" 203 or "Category Search" 204 transmits the inputted information to the server side 104 for having the search engine 108 conduct a search based on the search string query entered in box 201. Any suitable method for enabling a user to have a search executed and for executing the search that is or becomes known in the art can be used. The present invention is not limited in any way to the information on, format or method of use of start screen 200 shown in FIG. 2.

If desired, features could be included so that at any time during viewing of unique web pages or screens provided in accordance with the present invention, the user can change the search. In the embodiment shown, the user can enter a different search string or select a different quantity of search results than previously entered and selected, execute a new search and view the corresponding search results. For example, items 201, 202, 203, and 204 can be included on numerous or every unique web page or screen provided to the user (see e.g. FIGS. 4, 5, 6, 8, 9, 22, 23, and 24).

If desired, the search results may be presented in multiple formats appearing simultaneously or on different web pages or viewing screens. For example, in the embodiment of FIG. 3, the search results are presented on the user's computer display in two formats: in frame 301, the search results are presented in the prior art search engine format(s) as generally described above, and in frame 302, the search results are presented in a format unique to the present invention. In this example, the contents of frame 301 can be downloaded directly from the search engine 108 in FIG. 1 to the browser 102 and the contents of frame 302 can be downloaded from the CGI software 105*a* to the browser 102.

Figure 3:
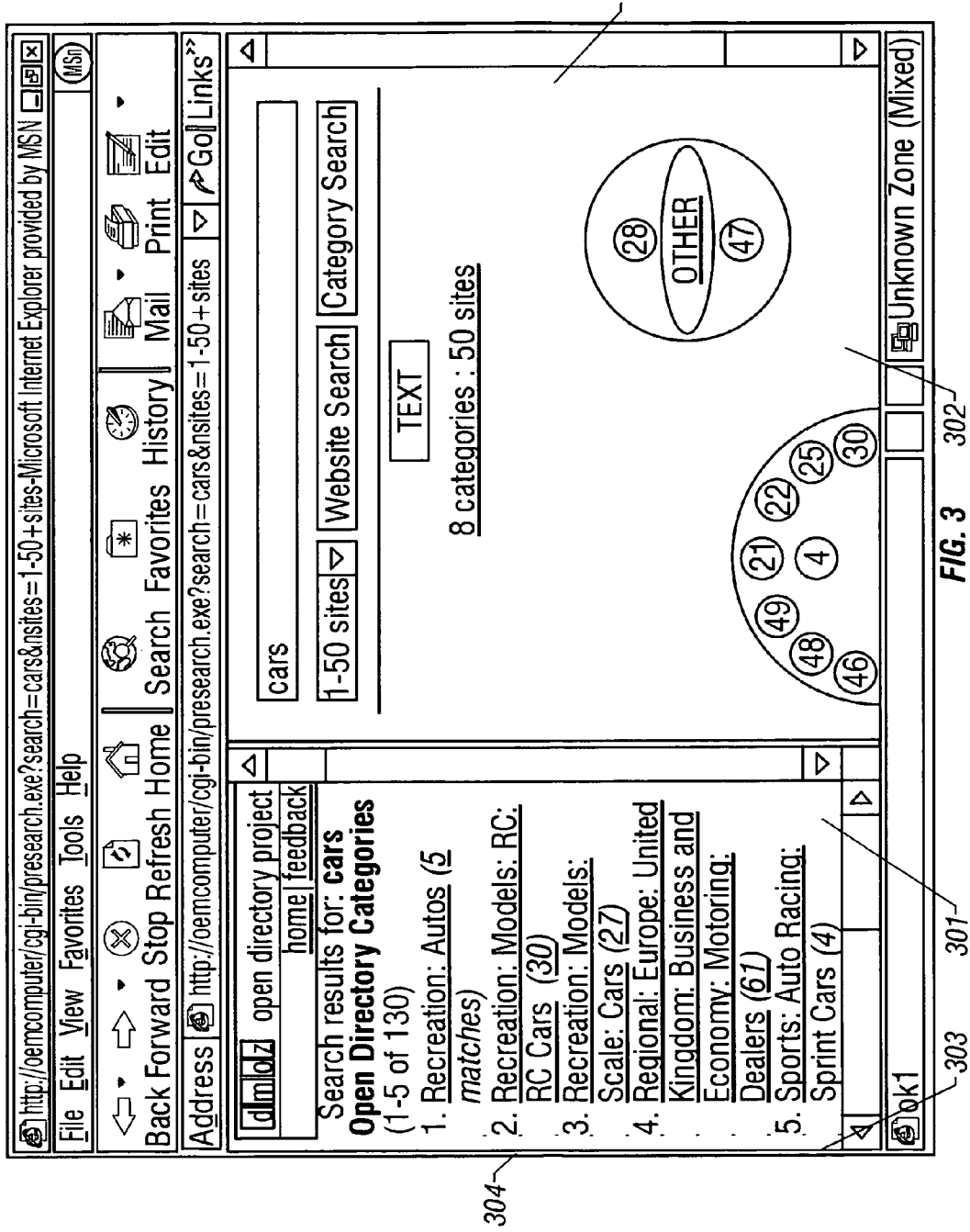
FIG. 3 is an illustration of an example search results presentation.

Frame 301 of the embodiment of FIG. 3 includes both of the general search result formats described above with respect to prior art search engines, or variations thereof. For example, frame 301 of FIG. 3 shows the standard search results page downloaded from the search engine that is accessible via URL address "www.dmoz.org". First, frame 301 of this embodiment shows the entire textual list of ranked matching web sites (not shown) in numerical order with hyperlinks to each web site.

Second, frame 301 shows a textual list of category paths of the search results that matched the search query ("cars"). Each category path can include a hyperlink to all web sites (matching and not matching) having that path, as is known in the art. For example, the words of the category path can be such a hyperlink. Alternately or additionally, a hyperlink to the matching web sites having that category path can be provided, such as a textual reference to the web sites, such as the textual reference "5 matches" or the numerical reference "30" shown in frame 301 of FIG. 3. However, frame 301 can be in any suitable format or need not even be included. The search results need not be displayed in multiple formats on the same screen, or web page. The present invention is thus not limited to having two frames, such as frames 301 and 302 of FIG. 3, and can have one frame, or more than two frames, or any other suitable format.

Figure 21:
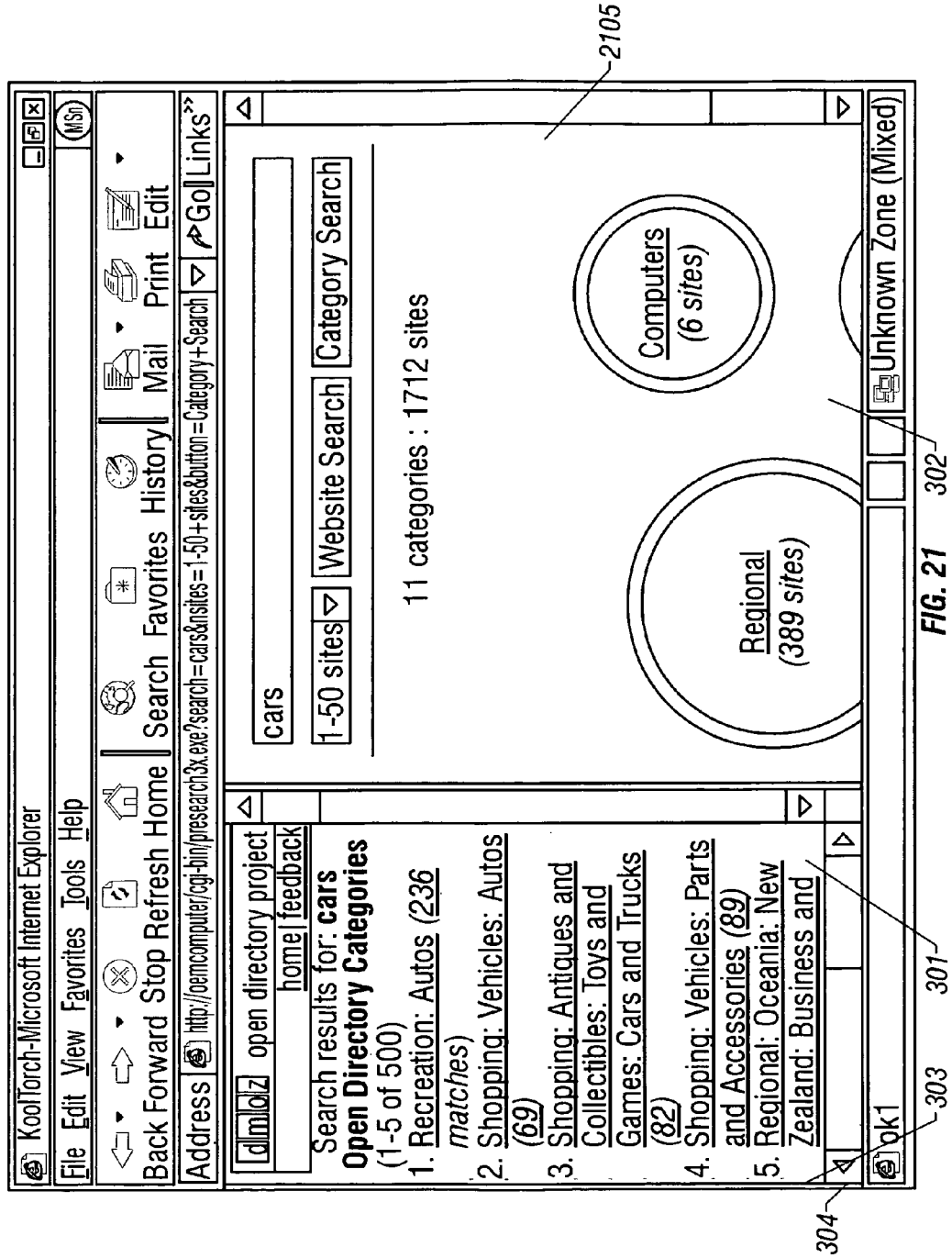
FIG. 21 is an illustration of an example presentation showing an extended list of matching categories.

Still referring to FIG. 3, the right frame 302 of this embodiment is used to display the search results in a format in accordance with an embodiment of the present invention. In accordance with the present invention, graphics, color, text, organization, sound, location and other attributes are used to display search results and, if it is desired, to lead to or present additional information. For example, an extended list of matching web sites for the selected search can be depicted in a single web page. Further, each such web site can, if desired, be shown in the context of its parent category. An example of such a format is web page 305 shown in frame 302 of FIG. 3, which is a "Website Search" results page. Another example would be where an extended list of matching categories for the selected search can be depicted in a single page. An example of such a format is web page 2105 shown in frame 302 of FIG. 21, which is a "Category Search" results page.

Figure 4:
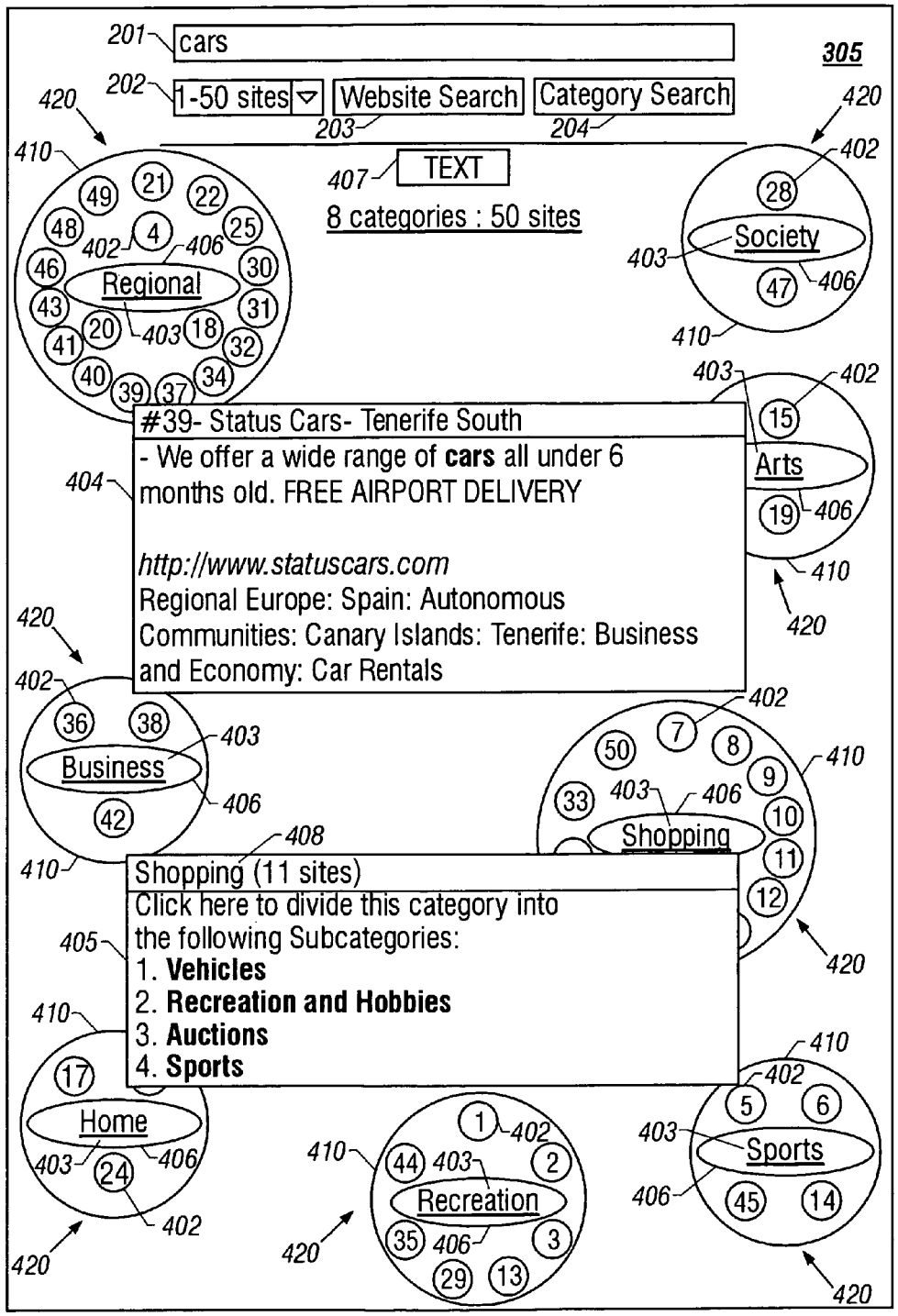
FIG. 4 is an illustration of an example search results presentation.

The example page 305 of FIG. 3 ("Website Search") is shown in its entirety in FIG. 4, which may be referred to herein as a "category page" or "parent category page" 305. As shown in FIG. 4, each matching web site for the search request in this embodiment is represented by its rank number. In the example shown, each matching web site or data element is represented by a bulb-like category member icon 402 having the web site's relative rank number depicted therein, such graphical representation referred to herein as a "web site icon or category member icon,"

Still referring to the embodiment of FIG. 4, each depicted web site 402 is shown on page 305 as being a member of the parent category 420 within which it belongs. Referring to FIG. 4, for example, the web site icons 402 for all of the selected number of matching web sites falling within each parent category 420("REGIONAL", "BUSINESS", "HOME", etc. . . . ) are grouped together and have the same color. Thus, color and organization are used in this example as indicating membership in a certain parent category. Adjacent each grouping of web site icons 402 in this embodiment is a textual representation of the parent category name 403. A category icon is preferably a border, such as a circle, 410, shown surrounding each group of web site icons 402 and parent category name 403. Category icons may be shaped to represent the category they represent, that is, the shape of a telephone for a category comprising a group of telephone numbers, a football for a category comprising a group of football players, or an icon shaped like a baseball, shopping basket or car for relevant categories. The entire display for each depicted parent category 420 in this embodiment includes the border 410, one or more matching web site icons 402 and the parent category name 403, and may be referred to herein as a "parent category cluster" 420 or category icon. Advertisements may be placed inside of the category icons 420 or activated when a user places a cursor over a category icon 420 or category member 402.

The web site of each depicted web site icon 402 can, if desired, be made accessible to the user. In the embodiment of FIG. 4, each web site icon 402 is a hyperlink to the web site being represented thereby, so that a user can access that web site upon selecting the icon 402. In such case, the web site will be downloaded to the browser 102 (FIG. 1) and its home page will appear on the user's computer display upon the user clicking or selecting the icon 402. Any other suitable format or method can be used to show or provide access to matching web sites, if these features are desired.

In another aspect of some embodiments of the invention, pop-up windows and the like can be generated to appear on the user's computer display to provide information, links to other web pages or web sites, or other features such as picture, video and sound excerpts from the underlying total data or relevant advertisements. Pop-up windows can be generated as is known in the art, such as with the use of any suitable pop-up window software that is or becomes known, such as the publicly available "OVERLIB" freeware written in Java Script. For example, in FIG. 4, positioning the user's computer mouse or pointer over any web site icon 402 (or other suitable access method) will cause a window 404 (shown for web site 39) to appear. In this embodiment, window 404 shows a description of and hyperlink to the web site, but can provide any desirable information in any suitable format. In a preferred embodiment, positioning the cursor over any category member icon alternatively produces a thumbnail picture, video or audio excerpt representative of the underlying data element resident within the category member represented by the icon. A category member can be accessed by clicking on the icon representing the member. Category members that have been examined visibly change, e.g., from a color to a gray scale or change shape to eliminate unnecessary repetitive examination by the user. Unviewed element can also be made to emit a beeping sound that grows louder as the curser becomes nearer to them within the category icon. These features may be particularly useful when viewing or reviewing 1000's of data elements which may cover a wide display area larger than the user screen when zoomed down to the data element level. For example, a search may turn up 1000 suspects pictures which a crime witness must review individually to make a positive identification. The ability to discern reviewed and unreviewed elements could speed up the task by eliminating a second review of data elements. Data elements which are viewed and deemed relevant for further review can be marked to appear in a third color or shape for further review.

Figure 5:
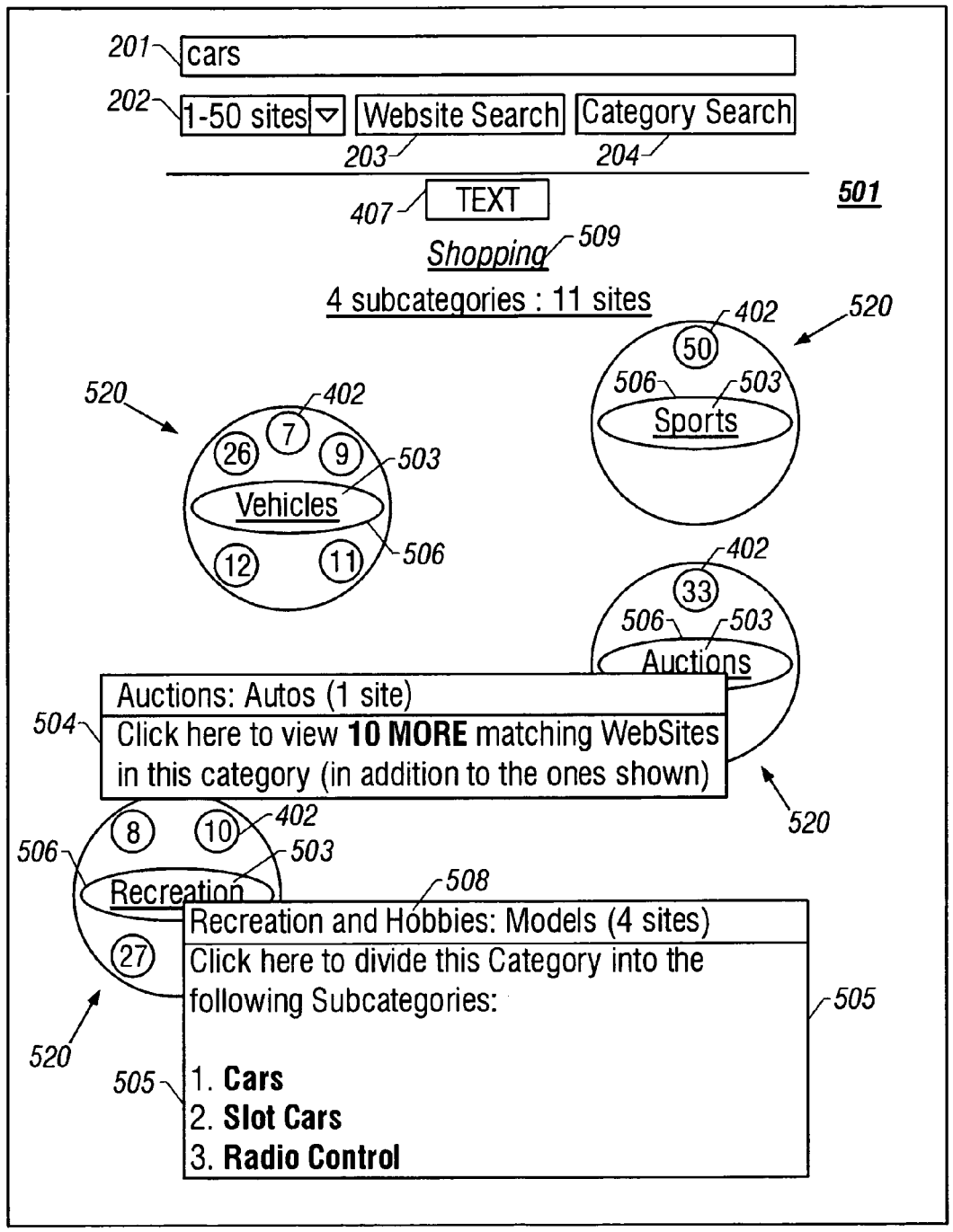
FIG. 5 is an illustration of an example search results presentation.
Figure 6:
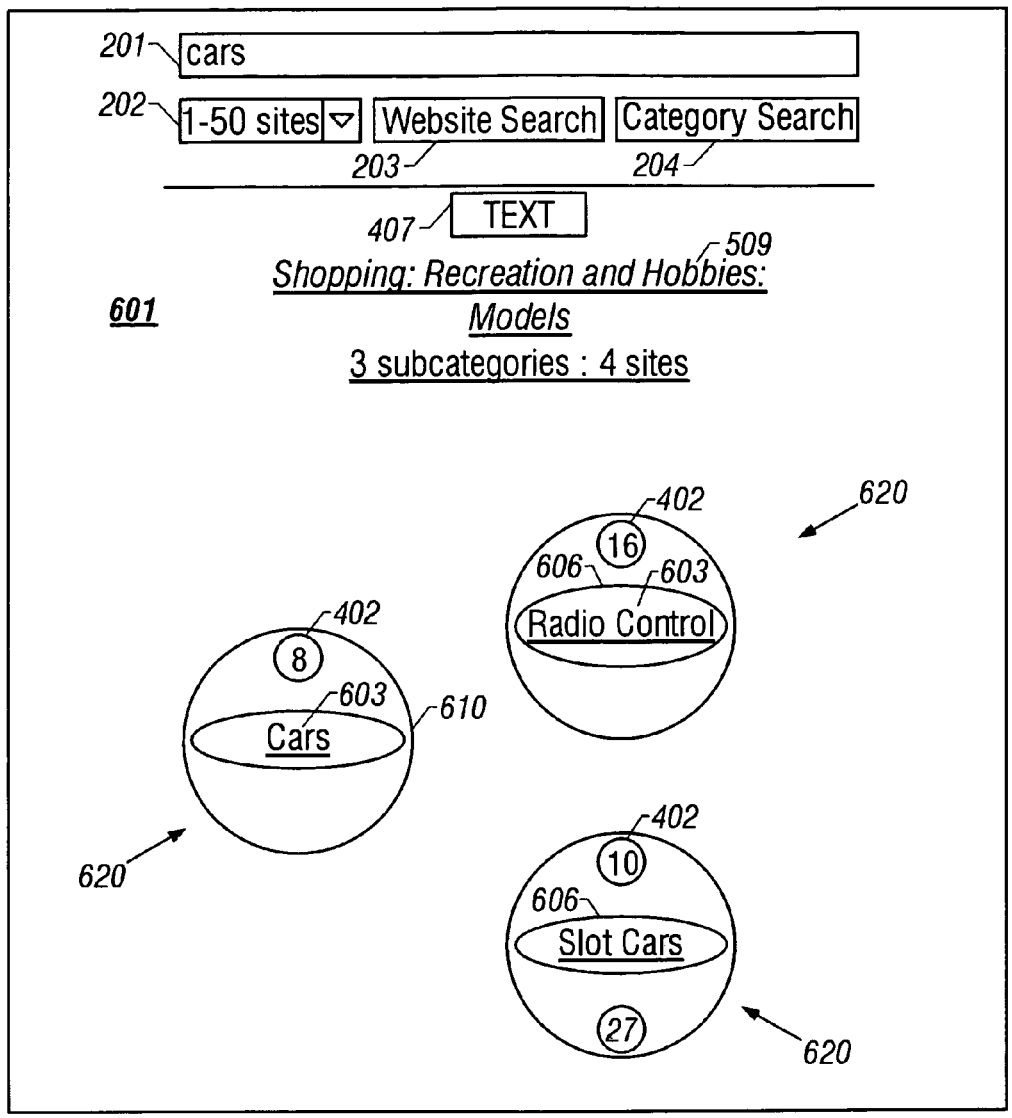
FIG. 6 is an illustration of an example search results presentation.
Figure 22:
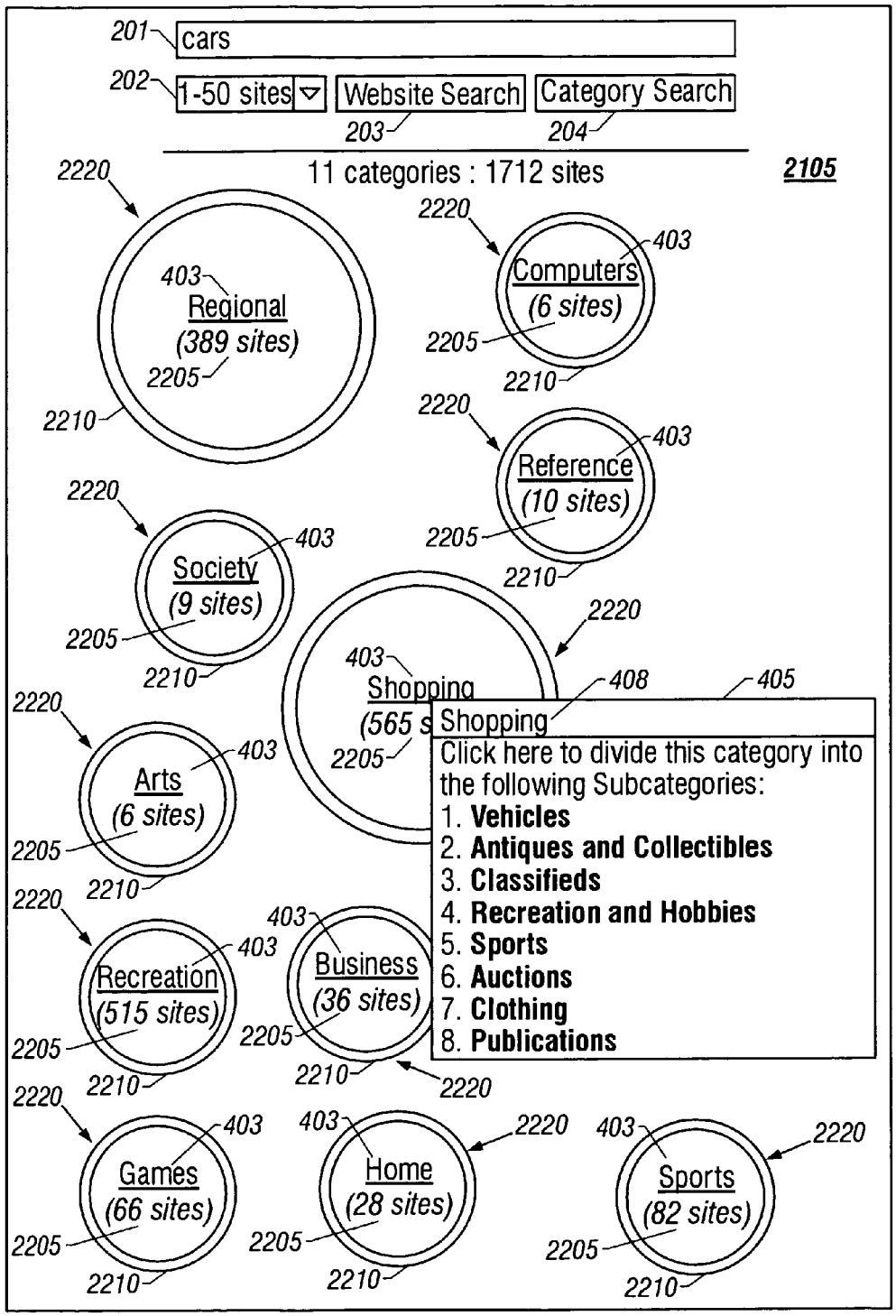
FIG. 22 is an illustration showing an alternative example presentation.
Figure 23:
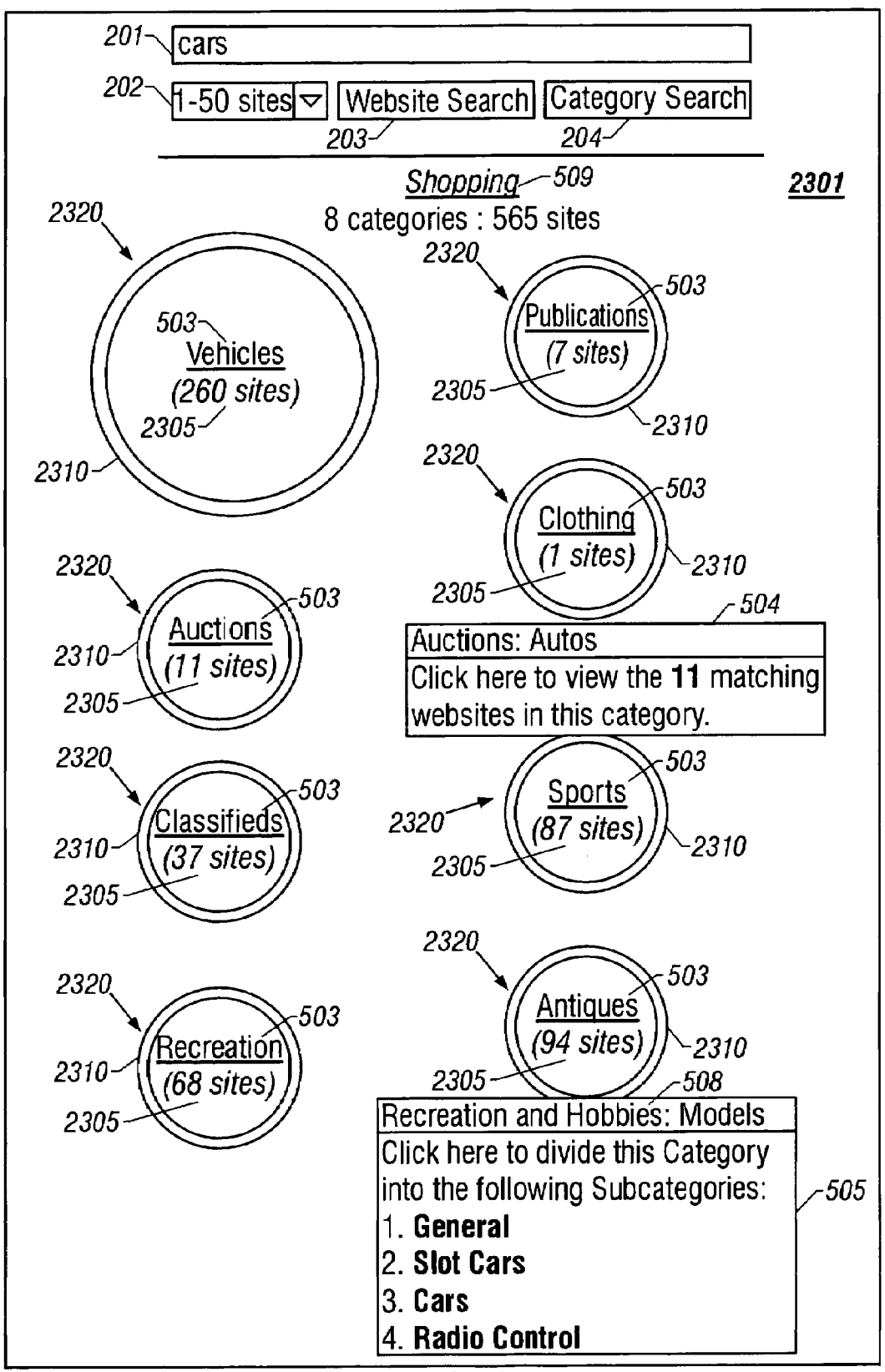
FIG. 23 is an illustration showing an alternative example presentation.
Figure 24:
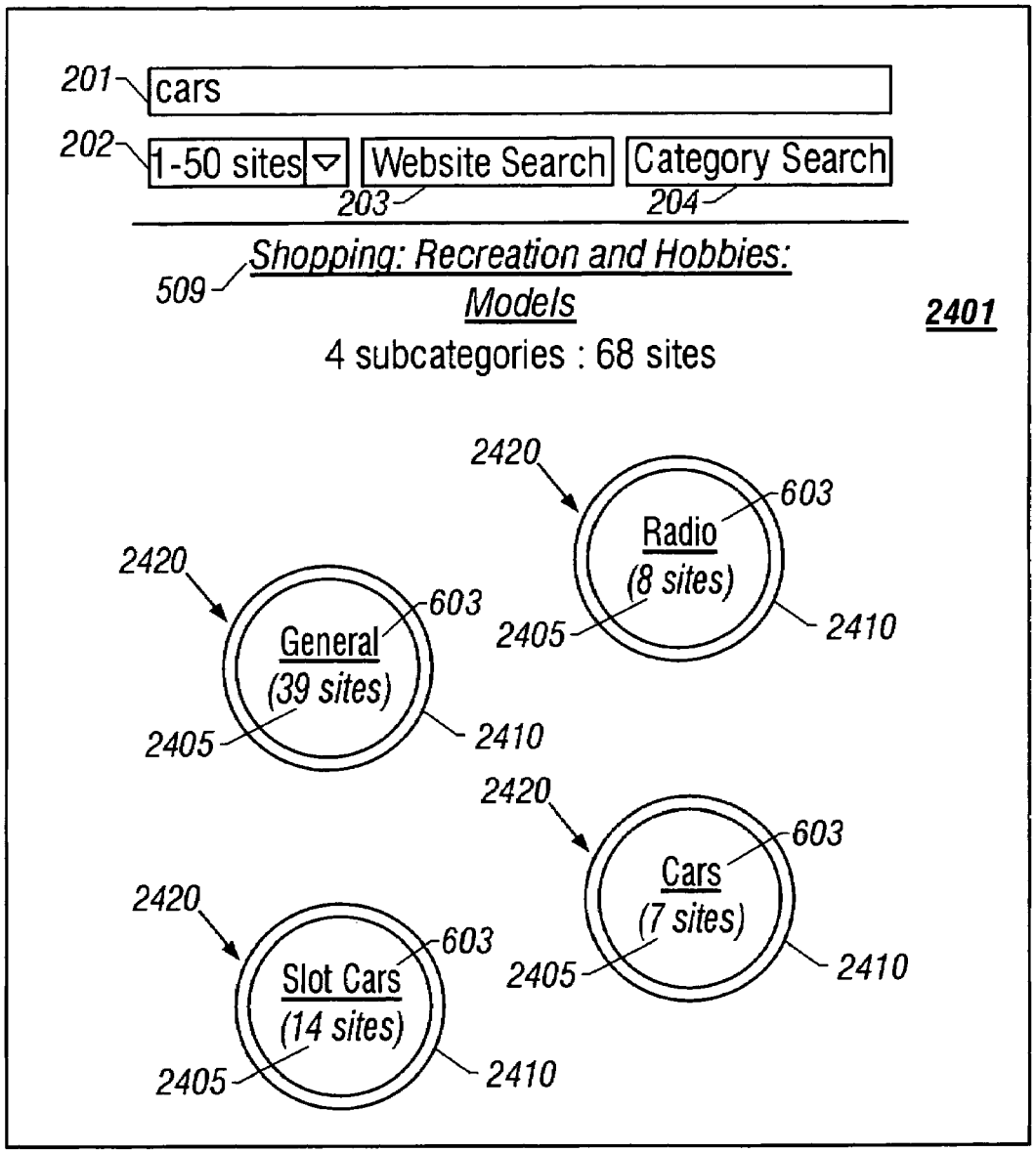
FIG. 24 is an illustration showing an alternative example presentation.

Some embodiments of the present invention can also place thousands of data elements in a hierarchical order by category by reviewing the elements and entering a category name. The data elements are subsequently displayed in category and subcategory icons. For example, a reviewer can look at 1000 pictures and classify them in 6 categories such as Man, Woman, Child, White, Black, Asian, etc. for subsequent display. As shown in FIGS. 4, 5, and 6, the category members or data elements of these examples are each represented explicitly by a category member icon. The presentation method is referred to as the "explicit" GUI option. As shown in FIGS. 22, 23, and 24, the category members or data elements of these examples are represented implicitly by a number representing the quantity of data elements or category members within the category. The presentation method is referred to as the "implicit" GUI option.

In another aspect of some embodiments of the invention, color may, if desired, be used to indicate whether any of the matching web sites in a depicted (parent or child) category have any uncommon subcategories. In the embodiment of FIG. 4, each of the parent category names 403 (or abbreviations thereof) are shown enclosed in a parent category icon 406. The color of the parent category icon 406 can be color coded, e.g., black (such as shown in FIG. 4) to indicate that at least one of the depicted matching web sites in that cluster 420 has a first (or lower) level subcategory in its category path that differs from at least one other depicted matching web site in that cluster 420. The parent category icon 406 can be a different color, such as gray (not shown), if there are no uncommon subcategories among the depicted matching web sites within a parent category or cluster 420 (see e.g., FIG. 5, subcategory icon 506 "AUCTIONS").

In another example, matching web sites may be shown in the context of their respective first (or first uncommon) level subcategories. This can be accomplished in any suitable manner. In the embodiment of FIG. 4, for example, positioning the user's computer mouse or pointer over a parent category name 403 will cause a pop-up window to appear identifying the first uncommon level subcategories of the web sites of that parent category. For example, positioning the user's cursor over the parent category name 403 "SHOPPING" in the black category icon 406 will cause window 405 to appear. Window 405 includes a heading 408, which is the parent category name ("Shopping") and the common category path of the depicted web sites.

Below the heading 408 is a textual listing of all of the first level subcategory names (or abbreviations thereof) for the depicted web sites in the "SHOPPING" category, namely "Vehicles", "Recreation and Hobbies", "Auctions", and "Sports." If all of the depicted matching web sites in that group were instead to have the same first level subcategory and possibly also the same further level subcategories, the heading 408 will include all such common subcategory name(s) (not shown), and the first uncommon, or next, level subcategories of the web sites will be listed in window 405 (see e.g. window 505, FIG. 5).

Figure 7:
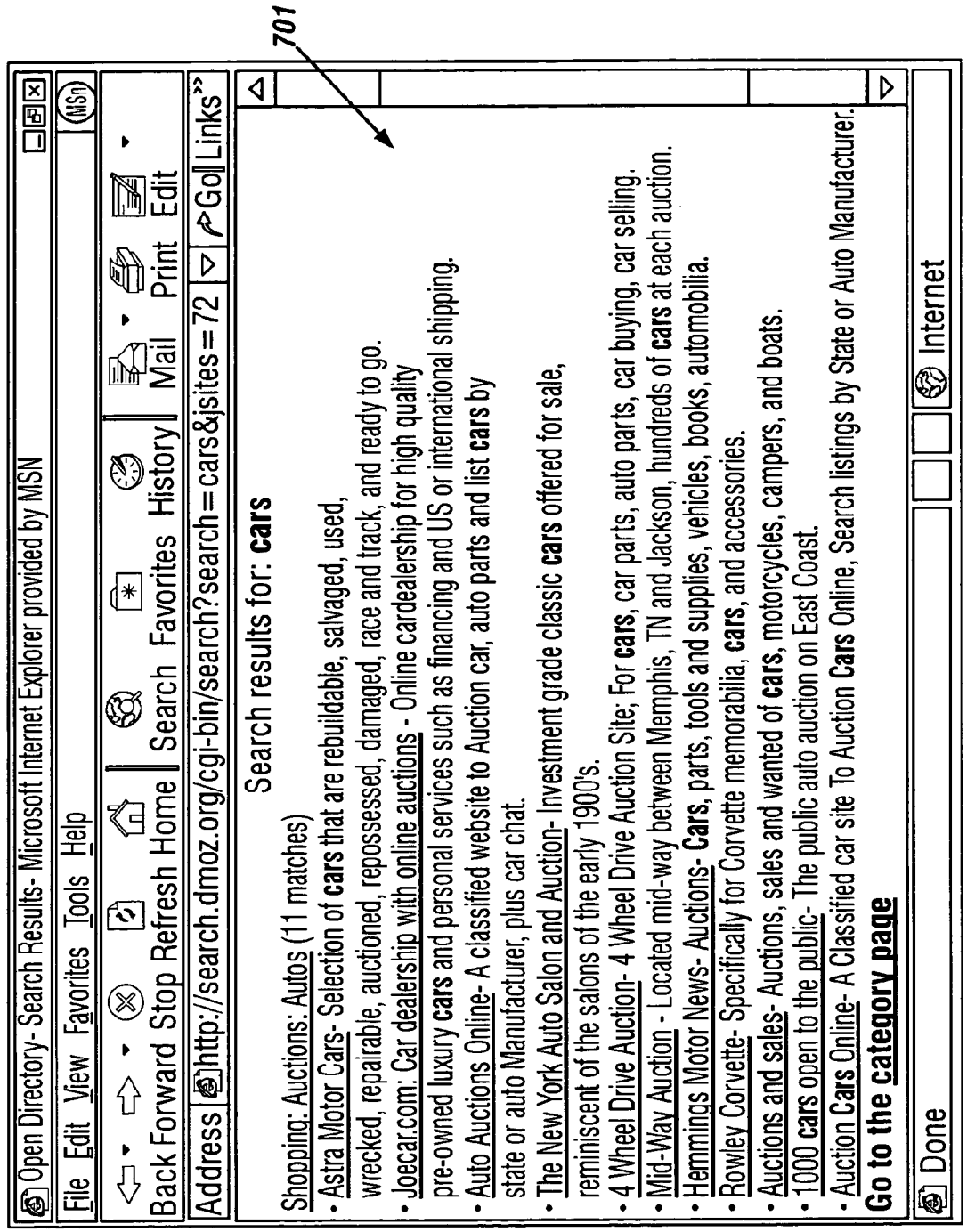
FIG. 7 is an illustration of an option in an example presentation.

The example category icon 406 is color coded, e.g., gray, thus, the present invention is designed to indicate that additional web sites exist in the database(s) searched that matched the search query, or request, additional to the selected number (such as 1-50) of ranked sites, provides access to such additional matching web sites. For example, in the embodiment of FIG. 5, a pop-up window 504 will appear when the user positions the mouse cursor or pointer over the first level subcategory name 503 appearing in a first level subcategory icon 506 that is gray, such as the exemplary first level subcategory name 503 "AUCTIONS." In this example, the window 504 indicates that there are "10 MORE" additional matching web sites beyond the depicted matching web sites for that subcategory. This embodiment also provides a link to a list of all matching web sites. For example, the subcategory name 503 can be such a link. Thus, selecting or clicking on the name 503 will cause a list of the depicted and additional web sites to appear, such as shown in web page 701 of FIG. 7. Page 701 shows a textual listing of the previously depicted matching web site(s) for "AUCTIONS" (web site # 33) and the additional matching web sites. The textual listing of each web site of this embodiment includes a description of and a hyperlink to each web site. In this embodiment, page 701 can be downloaded directly to the user's browser 102 (FIG. 1), such as to frame 302 (FIG. 3), from the search engine 108. However, the invention is not limited to this method of delivery.

Still referring to the example of FIG. 4, the depicted matching web sites of a parent category can also be depicted graphically, or with icons, in the context of their respective first (or first uncommon) level subcategories by selecting or clicking on a parent category name 403. This causes a new web page, or screen, 501 (FIG. 5) to appear on the user's display (such as by being downloaded to frame 302 of the user's browser), showing the depicted matching web sites icons 402 of the selected parent category of FIG. 4 in the context of their respective first (or first uncommon) level subcategories. In this example, the new first level subcategory page 501 appears upon the user selecting the parent category name "SHOPPING" of FIG. 4, page 501 showing the web site icons 402 of parent category "SHOPPING" arranged in the context of their first level subcategories, which, in this example, includes "VEHICLES", "SPORTS", etc. The user of this embodiment can select any parent category name of parent category page 305 (FIG. 4) to cause a first level subcategory page (such as page 501 of FIG. 5) to appear. Any other or additional suitable format or method for depicting matching web sites in the context of their respective subcategories can be used, if this feature is desired.

The subcategory pages, such as first level subcategory page 501, can have any desired format, features and capabilities, such as those described above with respect to page 305 and shown in FIG. 4. Thus, the features, format and capabilities of page, 305 and the entire description of the embodiment of FIG. 4 and page 305 above apply to FIG. 5 and page 501, except in the context of the first level subcategories instead of the parent categories.

For example, the general format of page 501 (FIG. 5) of this embodiment is similar to the format of the web page, or display, 305 of FIG. 4, except the depicted web sites in FIG. 5 are shown in the context of their respective first level subcategories. The web site icons 402 of the selected parent category are thus shown in groups formed around their respective first level subcategory names (or abbreviations thereof) 503, forming "first level subcategory clusters" 520.

In another example, in the embodiment of FIG. 5, the web site icons 402 of each parent category is depicted in a common color, such as the same color used on page 305, as shown in FIG. 4. In another example, a pop-up window (not shown) is provided in the same manner and with the same general information and features of window 404 of FIG. 4. In yet another example, the first level subcategory name 503 of each first level subcategory cluster 520 is shown in the same general manner and has similar general features as described above with respect to the parent category names 403, icons 406 and clusters 420 of page 305.

Similarly as explained above for page 305 and shown in FIG. 4, the depicted matching web sites on a page 501 of this embodiment can be viewed in the context of their respective second or lower level subcategories. If at least one of the depicted web sites in a first level subcategory cluster 520 has a second (or lower uncommon) level subcategory, the first level subcategory icon 506 is black. A pop-up window 505 showing a textual list of the second, or lower, level subcategory names (or abbreviations thereof) will appear in this embodiment upon positioning the user's mouse cursor or pointer over the first level subcategory name 503. For example, positioning the user's pointer over the first level subcategory name 503 "RECREATION" causes window 505 to appear. In window 505, the heading 508 includes "RECREATION AND HOBBIES: MODELS", indicating that the complete first level subcategory name is "RECREATION AND HOBBIES" and that each of the four depicted web sites has a common second level subcategory "MODELS". Thus, the textual list in window 505, "Cars", "Slot Cars" and "Radio Control", are the third level subcategories for the depicted matching web sites.

Also similarly as described above with respect to FIG. 4, the depicted matching web sites of a first level subcategory can also be shown graphically, or with icons, in the context of their respective second (or next uncommon) level subcategories by selecting or clicking on a first level subcategory name 503. In this embodiment, a new web page, or screen, such as page 601 (FIG. 6), will appear on the user's screen display (such as by being downloaded to frame 302 of the user's browser), showing the depicted matching web sites icons 402 of the selected first level subcategory of FIG. 5 in the context of their respective second (or next uncommon) level subcategories.

In the depicted example, selecting the first level subcategory name 503 "RECREATION" on page 501 (FIG. 5) will cause page 601 (FIG. 6) to appear. In this particular instance, the depicted matching web sites (#8, 10, 16 and 27) are shown in the context of their third level subcategories ("Cars", "Slot Cars", "Radio Control"), because they have a common second level subcategory "Models", as explained above. The invention can be designed so that a similar formatted page, or screen, would appear showing the respective matching web sites for each first level subcategory shown in FIG. 5. Thus, the user of this embodiment can select any first level subcategory name 503 of page 501 (FIG. 4) to cause the next uncommon level subcategory page (similar to page 601 of FIG. 6) to appear. Any other or additional suitable format or method for depicting matching web sites in the context of their respective various level subcategories can be used, if this feature is desired.

In another aspect of the illustrated embodiment of the invention, referring again to FIG. 5, if desired, the common portion of the respective category path (or an abbreviation thereof) for each depicted matching web site on a page may be shown. In this embodiment, the heading "SHOPPING" 509 reflects the common portion of the category path of all web sites shown on page 501. In FIG. 6, the common portion of the category path of the depicted web sites is shown as heading 609. In the example shown, the heading 609 is "Shopping: Recreation and Hobbies: Models", which reflects the common parent category and first and second subcategories for the depicted web sites and is shown in the same color as the web site icons 402.

Figure 12:
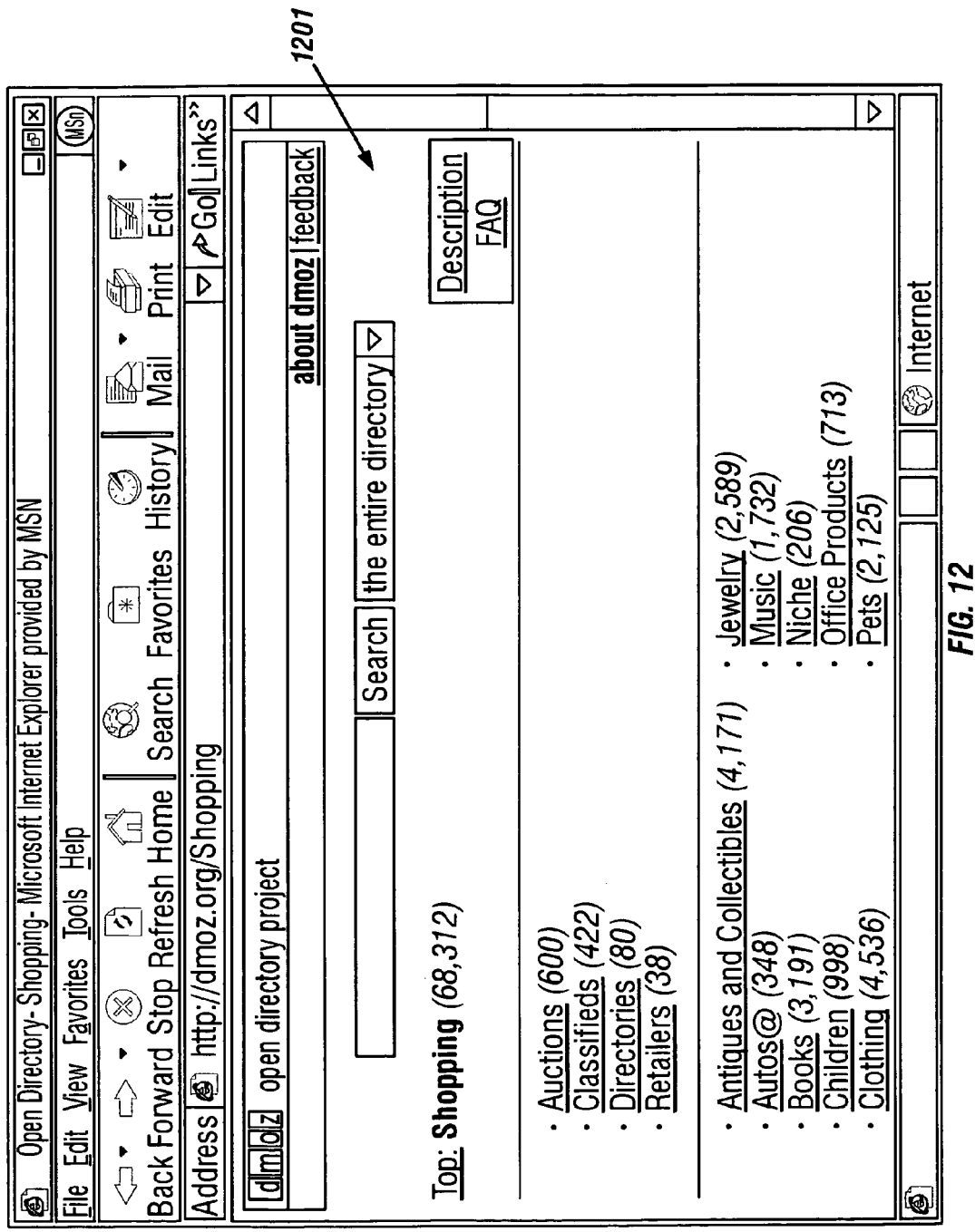
FIG. 12 illustrates a flow chart for an example embodiment.

The headings 509, 609 etc. of this embodiment may be used to access further information. For example, referring to FIG. 5, the heading 509 is a hyperlink that can be selected to cause a textual list (web page 1201, FIG. 12) of all subcategories of the common category path or heading 509 to appear on the user's computer display. On exemplary page 1201, all subcategories of the parent category "SHOPPING" in the entire database(s) searched by the search engine are listed. In the preferred embodiment, page 1201 is downloaded to frame 302 of the user's browser 102 (FIG. 1) directly from the search engine 108, such as via path 109. Further, each subcategory name on page 1201 is a hyperlink to another page showing further information. For example, selecting a subcategory name on page 1201 causes a list of all of the subcategories of the selected subcategory to be shown. The new page (not shown) can be in the same general format and have the same general features as page 1201.

Referring now to FIG. 6, page 601 has the same basic format, features and capabilities as described above and shown in FIGS. 4 and 5. Thus, the entire description of FIGS. 4 and 5 above applies to FIG. 6 and page 601, but in the context of the third level subcategories. From page 601, matching web sites could be shown in the context of their next uncommon level subcategories and so on, until the last subcategory for each matching web site is shown. In each case and for each new page, the above formats and capabilities could, if desired, be applied.

In another aspect of the illustrated embodiment of present invention, the user of this embodiment can navigate back and forth between previously viewed pages or screens, such as with the use of the "BACK" and "FORWARD" buttons or arrows typically appearing on a user's computer display or provided by the browser software, or by any other method that is or becomes known. New or different pages, or screens, can be viewed or a new or different path navigated through the search results pages, or category tree, such as by using methods described above.

Figure 8:
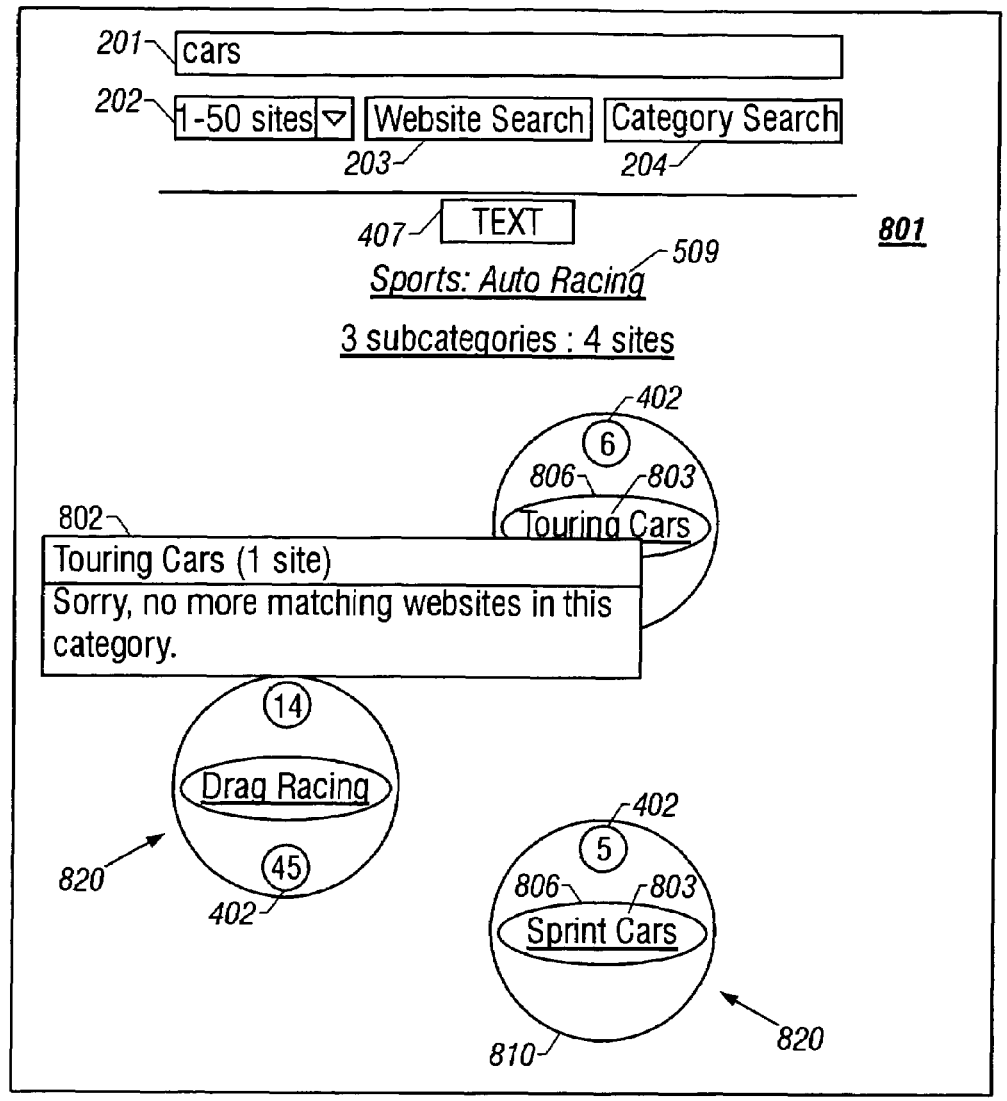
FIG. 8 is an illustration of an option in an example presentation.

In yet another aspect of the invention, the user of the illustrated embodiment is notified when there are no further matching web sites for a subcategory in the entire database(s) searched. For example, on web page 801 of FIG. 8, the color of the subcategory name 803 is shown in a different color, such as black (the other subcategory names are shown in this embodiment in white). In FIG. 8, the subcategory name 803 "TOURING CARS" is shown in black, which indicates that there are no additional matching web sites in that subcategory in the database(s) searched. Thus, in the example shown, only web site 6 matched the search query having the category path "Sports: Auto Racing: Touring Cars".

Any other suitable method or format may be used to show when there are no additional matching web sites for a category path or subcategory, if such feature is desired. For example, in the embodiment of FIG. 8, positioning the user's mouse cursor or pointer over a subcategory name 803 for category path having no further sub-categories or matching web sites will cause pop-up window 802 to appear. As shown, the window 802 includes a textual statement that there are no further matching web sites.

Figure 9A:
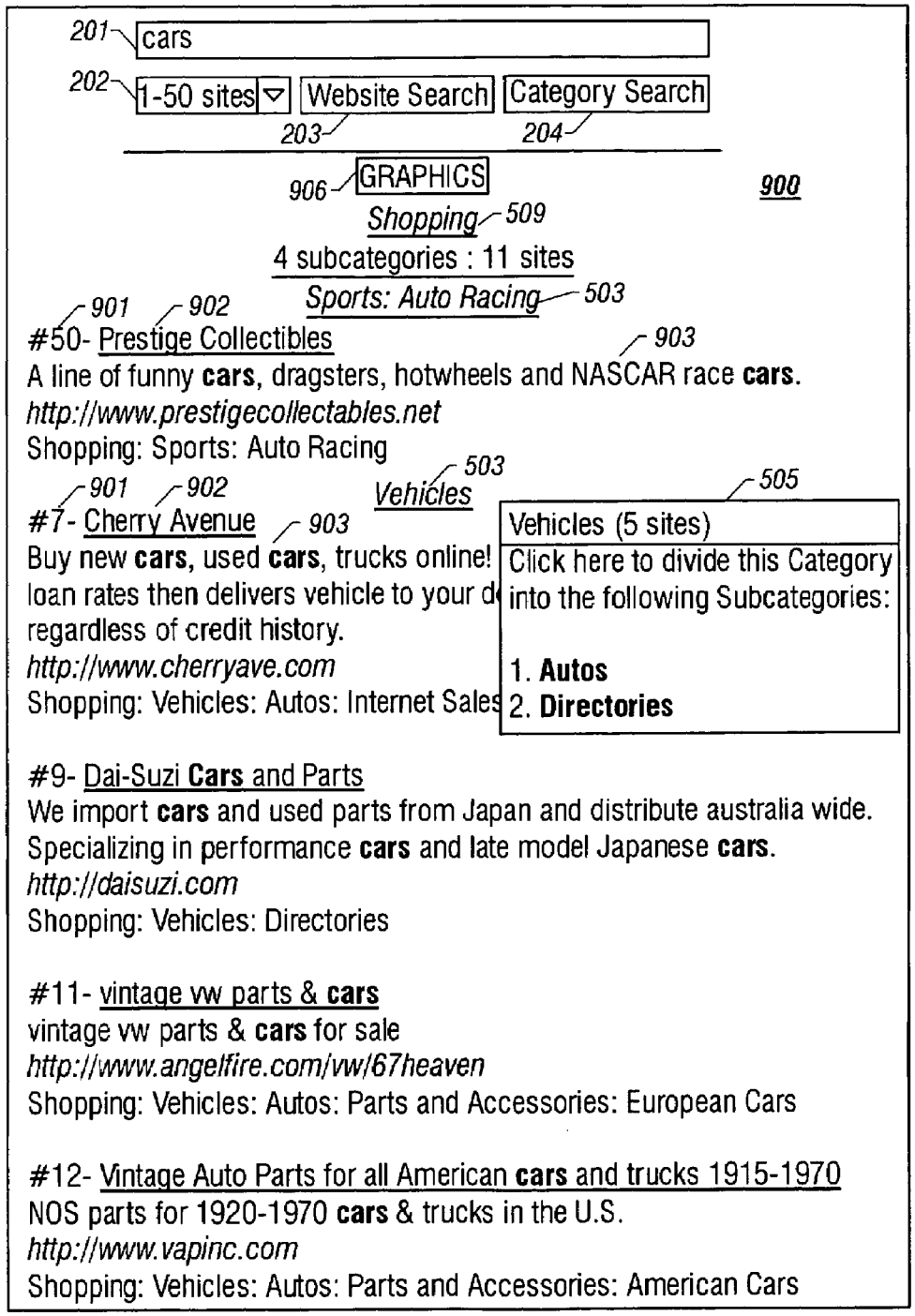
FIG. 9 is an illustration of an example textual presentation.

In still another aspect of the exemplary embodiment of the invention, search results may be viewable in various alternate formats, such as graphical, textual, and/or mixed graphical/textual formats. For example, the embodiments of pages 305 (FIG. 4), 501 (FIG. 5), 601 (FIG. 6) and 801 (FIG. 8) are web pages or screens that are generated, downloaded and shown in a primarily graphical format. In contrast, FIG. 9 shows an example of a web page 900 in primarily textual format. Page 900 shows the same search results as shown on page 501 of FIG. 5 and has the same general features. In the example of page 900, the depicted matching web sites are grouped together by their respective first level subcategories, similar to those shown in FIG. 5. The respective subcategory names 503 appear at the top of each grouping, such as "SPORTS: AUTO RACING", "VEHICLES", "AUCTIONS". Each matching web site is indicated by the site's rank number 901 and the web sites in each subcategory group are listed sequentially in numerical rank order. A hyperlink 902 to the web site and a description 903 of the site is also included. Further, each subcategory name 503 of this embodiment, possesses the same features, link properties and pop-up window capabilities as the subcategory names 503 on page 501 of FIG. 5. Primarily textual pages similar to page 900 can be included for each parent category and subcategory in addition to or instead of the corresponding primarily graphical pages, such as pages 305, 501, 601 and 801. However, any other suitable format and capabilities for showing search results may be used, if this feature is desired.

The present invention can, if desired, be designed so that the user can move back and forth between different formats. In the embodiments shown, the user can move between graphical and textual formats of the same search results, such as between pages 501 and 900. For example, each primarily graphical page, such as page 501 of FIG. 5 can include a mechanism, such as the "TEXT" button, or icon, 407, that the user can select to view the search results in a primarily textual format, such as page 900 of FIG. 9. Clicking on "TEXT" icon 407 of page 501 in FIG. 5, for example, results in the downloading and subsequent display of page 900 of FIG. 9. The reverse occurs in this embodiment by the user selecting the "GRAPHICS" button, or icon, 906 shown on page 900. Clicking on the "GRAPHICS" icon 906 will cause the same search results to be shown in a graphical format, such as page 501 of FIG. 5.

It should be understood that any of the above features and/or capabilities can be applied to any page or display provided in frame 302, or for any parent category or subcategory. However, none of the above features is required. Different formats, features and methods may be used to provide the same or other information or capabilities. The present invention is thus not limited to the methods, formats and capabilities described above. For example, page 2105 of FIG. 21 ("Category Search") is shown in its entirety in FIG. 22. This method of displaying the search results is similar to the "Website Search" method (FIG. 4) except that there are no matching websites icons displayed along with the matching categories. By excluding the first 50 (or 100) matching web-sites, there is no longer the restriction of displaying only those categories which contain one of the first 50 (or 100) matching websites. This allows for more categories to be displayed and thus ultimately more matching websites. Note that in this embodiment of the present invention this method of search results display utilizes only the first 100 unique category paths, which in this case corresponds to the 11 parent categories shown in FIG. 22. A larger number or all of the unique category paths may be selected for display. This "Category Search" page correlates to FIG. 4 for the "Website Search" page. Note that in this method a circle 2210 surrounds each parent category 403 and site total 2205 to form a "parent category circle" 2220. The site total 2205 shows the total number of matching websites within this parent category. By positioning the mouse cursor over a parent category 403 a pop-up window 405 appears in the same fashion as the "Website Search" page shown in FIG. 4. This pop-window displays the parent category 408 followed by the second-level subcategories below the current parent category. Identical to the "Website Search" page in FIG. 4, by clicking on the category name 403, for example "Shopping", a new web page 2301 will be downloaded into frame 302 as seen in FIG. 23 which correlates to FIG. 5 for the "Website Search" page. If a category has no more than 1 subcategory path below it, then this is indicated by a circle 2310 with a black ring and dark colored center as opposed to the usual dark colored ring and light center color (eg. "Auctions"). If the user positions the mouse cursor over such a category, for example "Auctions", a pop-up window 504 will appear which will indicate that the user can view the total number of matching websites 2305 in this category path. Identical to the "Website Search" page in FIG. 5, by clicking on such a "dead end" category name 503, for example "Auctions", a new web page 701 will be displayed listing the matching websites for the current category path. This is the identical web page displayed for the "Website Search" link in FIG. 4 for the "Auctions" category. Just as before, the names of the listed websites are linked to their web page addresses, therefore if the user clicks on one of these website names, that website will be downloaded to the user's browser. Referring again to FIG. 23, by positioning the mouse cursor over a second-level category 503, for example "Recreation", a pop-up window 505 appears in the same fashion as the "Website Search" page shown in FIG. 5. This pop-window displays the category name 508 followed by the subcategories below the current category. By clicking on this category a new web page 2401 in FIG. 24 will be displayed. This web page corresponds to FIG. 6 for the "Website Search".

In one embodiment, the present invention includes Graphical User Interface script software ("GUI script software") (not shown), which can be written, for example in Visual Basic Script or any other suitable programming language. Generally, the GUI script software is at least partially generated, or written, by the CGI software 105a (FIG. 1) based upon the search results from the search engine 108 and contains the HTML code for all unique web pages for the search results. The GUI script software, in this example, is downloaded from the CGI software 105a to the client system 101. Upon the user's request for a particular unique web page, the GUI script software of this embodiment provides the browser 102 with the HTML code for that page for the browser 102 to render, or create, the web page in frame 302.

Referring to FIG. 3, the GUI script software in this example is downloaded from the CGI software 105a into a "hidden" frame 304 (FIG. 3) in the user's browser software 102. The hidden frame 304 could be designed with a very small width and physically located proximate to the far left margin 303 of frame 301 (FIG. 3) so that it is not visible to the naked eye. The embodiment of FIG. 3 thus utilizes a total of three frames, hidden frame 304, frame 301 showing search results in prior art format and frame 302 showing search results in unique formats in accordance with the invention (and possibly also in prior art and other formats). The hidden frame 304 could be identified as "Frame 1", frame 302 identified as "Frame 2" and frame 301 identified as "Frame 3." Any other suitable alternate software or other mechanism for generating and downloading the desired web pages may be used.

FIG. 10 depicts the general format of an example of GUI script software that may be used with the present invention. Although the contents of this frame (as shown in FIG. 10) have been described up until now as one script program, technically the "program" consists of four distinct script modules. Each of these modules is written in the vbscript language. The distribution of these modules are as follows: module #1 consists of section 1001 in FIG. 10; module 2 consists of section 1002 in FIG. 10; module 3 consists of section 1003a in FIG. 10 as well as each subroutine as denoted by items 1003b in FIG. 10; and module 4 consists of section 1004 in FIG. 10. Referring to FIG. 10, there are "n" number of subroutines 1003b, each such subroutine associated with one unique web page provided by the present invention for the search results, such as pages 305 and 501 described above, out of a total of "n" possible web pages for the search results of a particular search. The function of each subroutine 1003b is to output the appropriate HTML code for its corresponding web page into frame 302.

As a reference in describing the operation of one embodiment of the invention, a complete list if all items 105a and 105b (in FIG. 1) residing on server 104a (in FIG. 1) is denoted in TABLE 1—

TABLE 1

1. Search.exe (Main CGI program - 105a)
2. Presearch.exe (small CGI program which returns initial frameset web page upon entering a search string - 105a)
3. Sublink.htm (Initial page returned to Frame #2 - 105b)
4. Sublink.exe (small CGI program which returns all subsequent pages to Frame #2 - 105a)
5. ktsubs.vbs (Subroutines called by script program in Frame #1 - 105b)
6. overlib.js (Script program that generates popup windows - freeware - 105b)
7. index.htm (Front page - 105b)
8. Assorted graphics files used in presentation of GUI. (105b)

In operation in accordance with one embodiment of the invention, when the user accesses the URL address for the server computer 104a of FIG. 1 of the present invention, the front page file, index.htm (ITEM 7 of TABLE 1), is downloaded to the user's browser 102 of FIG. 1. As demonstrated before, the generic representation of this type of page is indicated by FIG. 2. The HTML code for the Form on this page is shown in Table 2.

TABLE 2

```
<FORM action="/cgi-bin/presearch.exe" method="GET">
<INPUT TYPE="TEXT" NAME="search" SIZE="35">
<INPUT TYPE="SUBMIT" VALUE="Search">
<SELECT NAME="nsites" SIZE="1">
   <option>1-50 sites
   <option>1-100 sites
</SELECT>
</FORM>
```

This Form passes the search string (eg. "cars") to Presearch.exe (ITEM 2 of TABLE 1 and contained within 105a of FIG. 1) on the server using the GET method, with the search string set to parameter search and the number of sites ("1-50 sites" or "1-100 sites") set to parameter nsites. Presearch.exe returns the following web page shown below in Table 3 for the previous example in which a search is performed on "cars"—

TABLE 3

```
<html>
    <frameset cols=".001%,33%,*">
        <frame name="frame1" src="/cgi-bin/search.exe?search=cars" frameborder="no" scrolling="no" noresize>
        <frame name="frame3" src="http://search.dmoz.org/cgi-bin/search?search=cars">
        <frame name="frame2" src="/sublink.htm">
    </frameset>
</html>
```

This page constitutes the frameset from which the three previously described frames are defined. The src for Frame 1 is the main GUI program, Search.exe (ITEM 1 in TABLE 1 and contained within 105a of FIG. 1), with the search string set to "cars". The src for Frame 3 is a direct call to the search engine (dmoz.org which corresponds to 108 in FIG. 1). The src for Frame 2 is the file, Sublink.htm (ITEM 3 in TABLE 1 and contained within 105b of FIG. 1). This file appears below in Table 4.

TABLE 4

```
<html>
<body>
<form name="hform" method="GET" action="/cgi-bin/sublink.exe">
<input type="hidden" name="sub" value="1">
<input type="hidden" name="style" value="0">
</form>
</body>
</html>
```

This file only contains a hidden form hform which links to the Sublink.exe program (ITEM 4 in TABLE 1 and contained within 105a of FIG. 1). When this form is submitted, it passes the parameter sub with a value of 1 and the parameter style with a value of 0 to Sublink.exe using the GET method. sub=1 indicates Sub link1 (1003b in FIG. 10) which will render the very first interface page; and style=0 indicates a GUI versus a textual user interface. This hidden form is submitted by Frame 1 once all four script modules are completely downloaded. This is implemented by monitoring the Top.Status variable in Frame 1. As indicated by section 1001 in FIG. 10, which is script module 1, initially Frame 1 resets Top.Status (by storing the null string ""). This is shown in more detail by FIG. 13 ("Website Search") and FIG. 25 ("Category Search") both of which lists the first 34 and 21 lines, respectively, of the contents of Frame 1. Section 1001 of FIG. 10, script module 1, is embodied by LINES 1303-1305 of FIG. 13 and LINES 2503-2505 of FIG. 25. Once all four script modules are downloaded into Frame 1, Frame 2 is "reloaded" and the Top.Status variable is set to "ok1", as indicated by section 1004 of FIG. 10, which is script module 4. The code for script module 4 appears in FIG. 14. When the contents of all three frames (Frame 1, Frame 2, and Frame 3) are initially downloaded, Top.frame2.History.Length is 0. Therefore, LINE 1403 of FIG. 14 is executed—which submits hform in Frame 2, which currently contains sublink.htm. Submitting this form represents the "reloading" of Frame 2. Top.Status is then set to "ok1" (LINE 1409) to indicate that Frame 1 has completely downloaded. As mentioned above, when hform is submitted, it passes the parameter sub with a value of 1 and the parameter style with a value of 0 to Sublink.exe on the server. Then Sublink.exe returns the web page listed in FIG. 15a to Frame 2. LINE 1503 sets up a style sheet ID called overDiv. This ID is utilized by the popup window program for positioning the popup windows over the other graphics on the displayed page.

In LINE 1504 of FIG. 15a, the script program overlib.js (ITEM 6 in TABLE 1) is downloaded from the server. This script program, which is written in the javascript language, displays the popup windows as indicated by 404 and 405 in FIG. 4 and FIG. 22. This is a freeware program whose only function is to display popup windows.

LINES 1505-1508 in FIG. 15a contain a hidden form hform which links to the Sublink.exe program on the server passing the parameter sub with a value of 1 and the parameter style with a value of 0. This indicates Sub link1 (sub=1) and a GUI (style=0).

LINES 1509-1512 in FIG. 15a contain a hidden form hform1 which links to the Sublink.exe program on the server passing the parameter sub with a value of 1 and the parameter style with a value of 1. This indicates Sub link1 (sub=1) and a textual user interface (style=1). LINES 1513-1519 in FIG. 15a contain a script program (written in the vbscript language) which is automatically executed upon the loading of this web page. Since Top.Status has been set to "ok1" at this point (as described above), then LINE 1515 is executed. This command calls Sub link1 in Frame 1 passing a value of 0. This value is the style parameter and indicates a GUI as opposed to a textual user interface. At this point Sub link1 in Frame 1 writes the HTML code, which is necessary to render the first GUI (FIG. 4 or FIG. 22), to Frame 2.

When the user clicks on the TEXT button (407 in FIG. 4), hidden form hform1 (LINES 1509-1512) will be submitted. This form calls the Sublink.exe program on the server passing the parameter sub with a value of 1 (Sub link1) and the parameter style with a value of 1 (textual user interface). Sublink.exe will return a new web page which appears in FIG. 15b. The only difference between FIG. 15a and FIG. 15b is that the style parameter is reversed in LINES 1507, 1511, and 1515. If the value is 0 in FIG. 15a then it is 1 in FIG. 15b and vice versa. Just as with the web page of FIG. 15a, the script program in LINES 1513-1519 of FIG. 15b is automatically executed upon loading of the web page. Since Top.Status is still set to "ok1", LINE 1515 is executed. This command calls Sub link1 in Frame 1 passing a value of 1. This value is the style parameter and indicates a textual user interface as opposed to a GUI. At this point Sub link1 in Frame 1 writes the HTML code, which is necessary to render the first textual user interface, to Frame 2. Note that for the "Category Search" situation, only FIG. 15a will be utilized since there is no "TEXT" or "GRAPHICS" buttons on any such GUI pages from which hform1 could be submitted.

If the user, after viewing the initial interface page, subsequently links to another interface page or website, and then clicks the Back button on the browser, then all three frames will be reloaded simultaneously. LINE 1304 of FIG. 13 ("Website Search") or LINE 2504 of FIG. 25 ("Category Search"), which is the single command of script module 1 that resides in Frame 1, will almost certainly be executed before LINE 1514 of FIG. 15a (or FIG. 15b), which resides in Frame 2. It is also apparent that LINE 1514 is likely to be executed before LINE 1402 of FIG. 14. FIG. 14 shows script module 4 of Frame 1. This script program is not loaded until the previous three script modules in Frame 1 are loaded. Thus, when LINE 1514 is executed, Top.Status will have been reset (at LINE 1304 or LINE 2504), and therefore, LINE 1517 is executed which sets Top.Status to "ok2". Then when LINE 1402 is executed Top.frame2.History.Length will be greater than 0 since at least one page (sublink.htm) has been loaded into Frame 2. Hence, LINE 1405 will be executed and since Top.Status has been set to "ok2" then LINE 1406 will be executed followed by the execution of LINE 1409 which sets Top.Status to "ok1". When LINE 1406 is executed then hidden form hform in Frame 2 is submitted. If the previous interface page was a GUI style interface then hform is shown in LINES 1505-1508 in FIG. 15*a*, else if the previous page was a textual style interface then hform is shown in LINES 1505-1508 in FIG. 15*b*. When submitted, this form calls the Sublink.exe program on the server passing the parameter sub with a value of 1 (Sub link1) and the parameter style with a value of 0 (GUI) in FIG. 15*a* or a value of 1 (textual user interface) in FIG. 15*b*. Sublink.exe will return a new web page which is an absolute duplicate of the current page in Frame 2. By the time this new web page is loaded into Frame 2, LINE 1409 (as previously mentioned) will have already executed in Frame 1. So when LINE 1514 is executed in Frame 2 Top.Status is set to "ok1". Therefore, LINE 1515 will be executed. The execution of this command, as explained earlier, calls Sub link1 in Frame 1 passing a value of 0 (GUI) for FIG. 15*a* or a value of 1 (textual user interface) for FIG. 15*b*. At this point Sub link1 in Frame 1 writes the HTML code, which is necessary to render the GUI or textual user interface, to Frame 2.

It should be noted that while the previous explanation of the interaction between Frame 1 and Frame 2, while utilizing FIG. 15*a* (or FIG. 15*b*), has been restricted to the first interface (Sub link1), the function is the same with all other interface pages. The only difference would be the setting of the sub parameter in the forms (hform and hform1) and the spelling of the subroutine call (LINE 1515). For instance, for Sub link2, LINES 1506 and 1510 would set value="2" and the subroutine call in LINE 1515 would be spelled as parent.frame1.link2.

Referring to FIG. 10 and FIG. 13 or FIG. 25, after script module 1 (Section 1001 in FIG. 10 and LINES 1303-1305 in FIG. 13 or LINES 2503-2505 in FIG. 25) is loaded in Frame 1, script module 2 is loaded (Section 1002 in FIG. 10 and LINE 1306 or LINE 2506). This script module is stored in a separate file on the server—ktsubs.vbs (ITEM 5 in TABLE 1)—and is downloaded from there. This file contains several standard subroutines which are called by each main subroutine (1003*b* in FIG. 10). The reason these standard subroutines are stored in a separate file is because they are static—they never change. These standard subroutines are listed in TABLE 5.

TABLE 5

1. OutputHeader
2. OutputRing
3. OutputOval
4. OutputDots
5. OutputCircle

After this file is downloaded, script module 3 is loaded beginning at LINE 1307 of FIG. 13 ("Website Search") or LINE 2507 of FIG. 25 ("Category Search"). As described earlier, this script module contains all of the subroutines which render each and every possible interface page for the search results. For simplicity, FIG. 13 only lists the declaration of the global variables and the initialization of the pertinent global variables (capray, textray, linkray, and catray) for the first 5 websites, out of a total of 50 websites, for a "Website Search" (Section 1003*a* in FIG. 10 and LINES 1308-1336 in FIG. 13). There are seven global variables (LINES 1308-1314) which are one-dimensional arrays that store various information for each website. There are no global website variables to initialize for a "Category Search" since there are no websites to display, therefore FIG. 25 only lists the first GUI subroutine, Sub link1 (Section 1003*a* in FIG. 10 and LINES 2508-2521 in FIG. 25). Note that the complete listing of all of the GUI subroutines would be too long to list.

In FIG. 13 ("Website Search"), the global arrays contain 50 elements each, since there are a maximum of 50 websites in this example (since the 1-50 websites option was chosen). capray stores the title/caption of the website. textray stores the general text description of the site. linkray stores the URL link which is the internet address for the website. catray stores the category path for the website. dotindx stores the list of indexes of the particular websites contained in any given cluster at the time that cluster is output. The two remaining global variables, xray and yray, store the 2-dimensional location (relative to the center of each cluster) of each website icon on the screen. The values of these two variables are set inside of each subroutine (1003*b* in FIG. 10) since the position of each website icon changes with each GUI page. LINES 1315-1334 in FIG. 13 show how the pertinent global variables for defining each website (excluding xray and yray) are initialized for the first 5 websites.

After initializing all of the pertinent global variables in Frame 1, all of the subroutines for rendering each and every GUI page are exported to Frame 1. These subroutines are indicated as items 1003*b* in FIG. 10.

Using the GUI page indicated in FIG. 5 ("Website Search") as an example, the subroutine for rendering this page is listed in FIG. 18. Notice that the first line (LINE 18001) of this subroutine calls subroutine OutputHeader (ITEM 1 of TABLE 2). Note that in this instance the style parameter would be set to 0 to indicate a GUI interface. This standard subroutine outputs the portion of HTML, represented in FIG. 5, from the top of the page down to the line, "4 subcategories: 11 sites".

Referring to FIG. 5 and FIG. 18, each of the four clusters in FIG. 5 is indicated by three subroutine calls in FIG. 18: first a call to OutputRing (ITEM 2 of TABLE 2), next a call to OutputOval (ITEM 3 of TABLE 2), and then, after initializing the website index and the x-y position of each dot, a call to OutputDots (ITEM 4 of TABLE 2). Note that the method used for positioning the graphics in an x-y grid in the browser frame window is the Cascading Style Sheets model, or CSS.

Now referring to the GUI page indicated in FIG. 23 ("Category Search") as an example, the subroutine for rendering this page is listed in FIG. 26. Note that for each "Category Search" subroutine call, the style parameter is set to 0 to indicate a GUI interface. Notice that the first link of this subroutine calls subroutine OutputHeader (ITEM 1 of TABLE 2). In this instance this subroutine outputs the portion of HTML, represented in FIG. 23, from the top of the page down to the line, "8 subcategories: 565 sites". Referring again to FIG. 23 and FIG. 26, each instance of a circle is represented by a call to subroutine OutputCircle (ITEM 5 of TABLE 2).

Figure 11A:
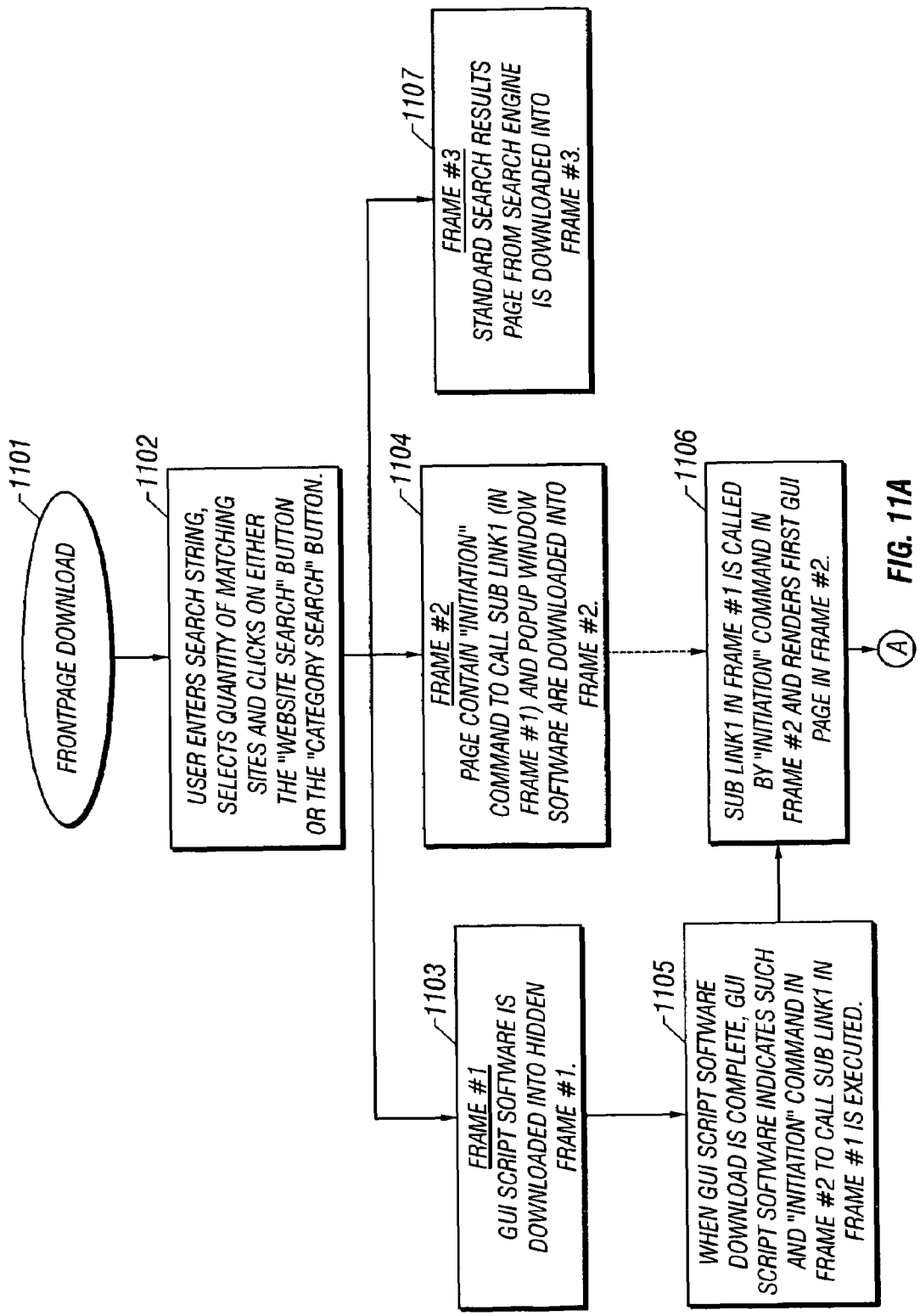
FIG. 11 illustrates a flow chart for an example embodiment.
Figure 11B:
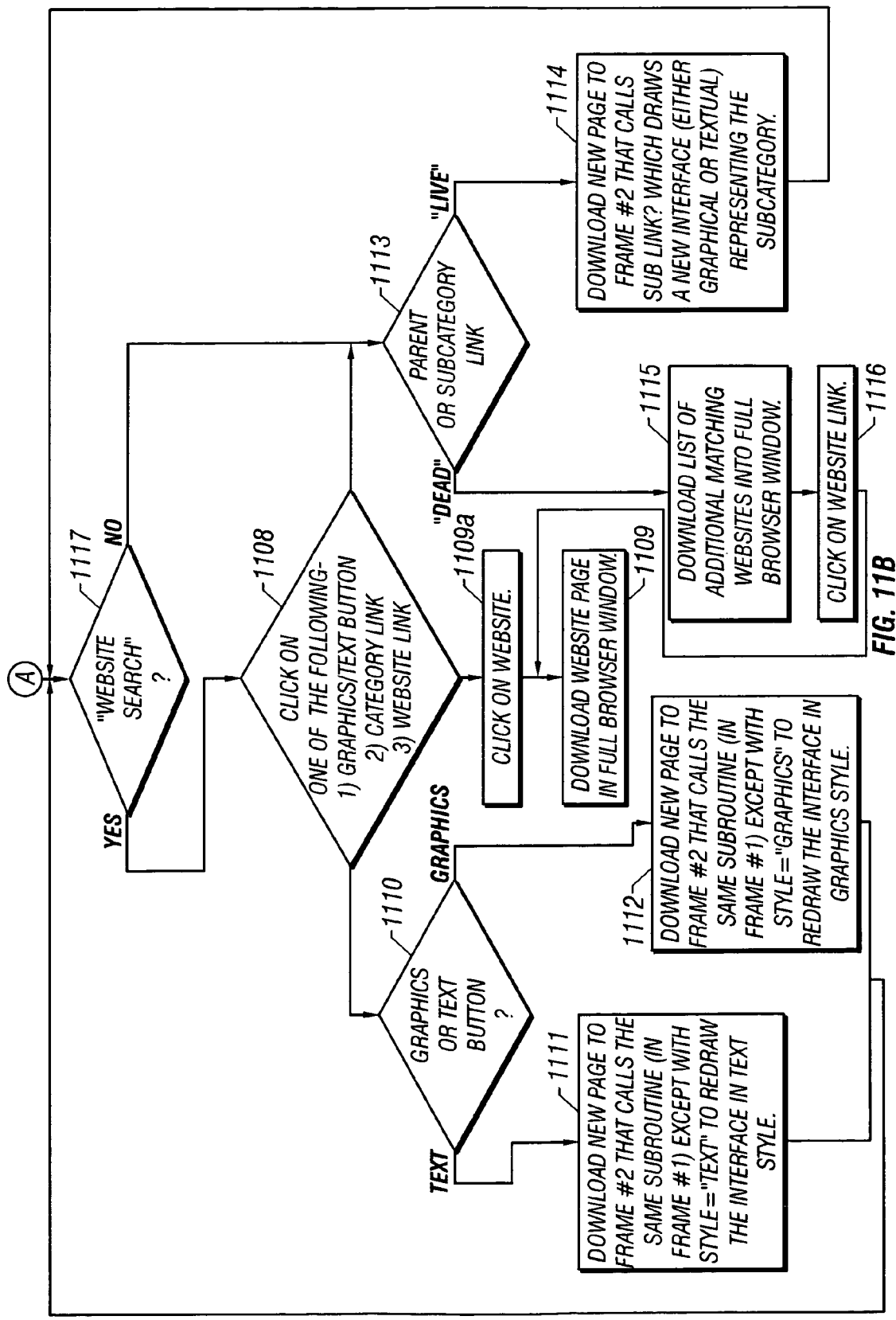

FIG. 11 is a flowchart showing various methods and capabilities of one embodiment of the invention utilizing CGI software and GUI script software as utilized from the client side (101 of FIG. 1). In item 1101, a request page, or screen (see e.g. FIG. 2 or ITEM 7 of TABLE 1), is downloaded to the user's browser software 102 (FIG. 1) from the CGI software 105*a* residing on the server 104*a* (FIG. 1). This download can be caused when the user enters the URL address of server 104*a* in the browser's address box, or other suitable methods. In item 1102, in this embodiment, a user enters information, such as a search string, selects the number of results to display (for a "Website Search", such as 50 or 100), and then selects either the "Website Search" button or the "Category Search" button, such as shown in FIG. 2 and described above.

In this embodiment, in accordance with items 1103, 1104 and 1107, the CGI software downloads three frames to the user's browser, via Presearch.exe (ITEM 2 in TABLE 1). Item 1104 of this embodiment involves downloading a minimal web page, Sublink.htm (ITEM 3 in TABLE 1), to Frame 2, which as described earlier contains a hidden form, hform. This form could be described as an "initiation command". Item 1107 of this example includes downloading Frame 3 (e.g. frame 301, FIG. 3), which can include a standard search results page of the search engine and have all the capabilities thereof. Item 1107, however, is not necessary for the present invention.

Item 1103 involves downloading Frame 1 (e.g. hidden frame 304 in FIG. 3) from the CGI software. This includes downloading GUI script software for providing the various screen images and text for the web pages that will be contained in Frame 2 (e.g. frame 302 in FIG. 3). The downloaded GUI script software includes subroutines Sub link1, Sub link 2, Sub link 3, etc. Sub link1 of this embodiment will generate the initial web page shown in Frame 2 (see e.g. page 305, FIG. 4), and each remaining subroutine will generate a separate web page to represent a different category or subcategory of the category tree of the search results, such as shown in FIG. 5, 6, 8.

In this embodiment, as shown in items 1105 and 1106, when item 1103 is complete (all necessary GUI script subroutines for rendering all possible web pages for Frame 2 are downloaded into Frame 1), then script module 4 (see 1004 in FIG. 10 and FIG. 14) is downloaded into Frame 1 and executed. When this module is executed, as described earlier, hform in Frame 2 is submitted, indicating the execution of the "initiation command". Upon submission of this form, Sublink.exe (ITEM 4 in TABLE 1) is called on the server (104 of FIG. 1), which returns the web page indicated in FIG. 15a. This page includes basic header information, a link to overlib.js (ITEM 6 in TABLE 1), which contains computer software code for generating pop-up windows and a command, Call parent.frame1.link1(0), which calls "Sub link1" located in the GUI script software in Frame 1. As described earlier, this command is executed and as a result, Sub link1 in Frame 1 is executed. As a result an initial category, or search results, web page (e.g. page 305, FIG. 4) is downloaded and shown in Frame 2. Thereafter, in accordance with this embodiment, the user may view any pertinent subsequent or alternate category web pages in Frame 2, available pop-up windows, web sites or other linked pages, or any other information available via Frames 2 or 3 (such as those activities shown in the bottom half of the flowchart of FIG. 11).

For example, in the case of a "Website Search", as indicated by item 1117, item 1108 shows three of the events that the user can initiate in accordance with this embodiment. In item 1109a, the user can cause the downloading and thus appearance of the web site of any matching web site indicated on a category page (Frame 2) by selecting a web site icon 402 or other link. This will initiate item 1109, where the selected web site will be downloaded to the user's browser. The user can move back up to item 1108 by conventional methods, such as with the "BACK" command or arrow associated with the user's browser.

Referring to item 1110, the user can move between different category page formats. In this embodiment, according to item 1110, the user can move between generally graphical and textual formats by clicking on a "GRAPHICS" or "TEXT" button appearing on the depicted web page. As shown in item 1111, if the user clicks on a "TEXT" button, the GUI script software will execute the same subroutine that was called to render the current page (appearing in Frame 2), but instead with the command style="TEXT". This will cause the GUI script software to generate and load in Frame 2 a textual category page (see, e.g., FIG. 9) showing the same results as the previous graphical category page. Conversely, as shown in item 1112, if the user clicks on a "GRAPHICS" button, the same subroutine will again be called, except with style="GRAPHICS". This will cause the script software to generate and load in Frame 2, a generally graphical category page (see, e.g., FIGS. 4, 5, 6, 8) showing the same results as the previous textual category page. In either case, with this embodiment, after the new category page is loaded in Frame 2, the user is returned to item 1108.

Referring to item 1113, which applies to either a "Website Search" or a "Category Search" in this example, search results shown on a category page of this embodiment may be shown in the context of the next pertinent subcategory level. In item 1113, with regards to a "Website Search", when the user selects a parent category name or a subcategory name (such as names 403 of FIG. 4, 503 of FIG. 5) in white lettering, on a category icon (such as icons 406, 506) appearing in black, item 1114 will occur, indicating a "Live" category which has further subcategories beneath it. Similarly, in item 1113, with regards to a "Category Search", when the user selects a parent category name or a subcategory name (such as names 403 of FIG. 22, 503 of FIG. 23) in a circle with a colored rim, item 1114 will also occur. In item 1114, a new subroutine of the GUI script software in Frame 1 will be called to render a new category page, which will be downloaded into Frame 2. This page will be displayed in the same format, either graphical or textual, as the format displayed on the previous page (where the selection was made). After the new page is loaded in Frame 2, the user is returned to state 1108.

As provided in item 1115, with regards to a "Website Search", if the user clicks on a category or subcategory name over a category/subcategory icon shown in gray, indicating a "Dead" or "dead-end" category which has no more subcategories beneath it, a new category page (see e.g. FIG. 7) showing a list of all web sites in that category/subcategory that matched the search query will be downloaded to the browser. Similarly, in item 1115, with regards to a "Category Search", if the user clicks on a category or subcategory name in a black-rimmed circle, a new category page (see e.g. FIG. 7) showing a list of all web sites in that category/subcategory that matched the search query will be downloaded to the browser. In item 1116, if the user clicks on a web site link included in the list, that web site will be downloaded to the browser as in item 1109. Each above act need not be included or occur in the above order; additional or different acts may be included.

Now referring to ITEM 1 in TABLE 1, Search.exe, the main CGI program of this embodiment which resides on the server (105a of FIG. 1) and which imports the search results from the dmoz.org search engine (109 of FIG. 1) and exports to the user's browser (102 of FIG. 1), the various script programs and subroutines to render the previously described GUI and textual user interface pages. The search results from the dmoz.org search engine are imported using a WINSOCK interface using the URL for a standard search results web page.

Referring to the "Website Search" method, the dmoz.org search results page for the first 20 matching web sites using "cars" as the search query is shown in FIG. 19. Note that after a listing of the first 5 matching "Open Directory Categories"

is the first 20 matching "Open Directory Sites" of which the first 3 are shown in this figure. These "Open Directory Sites" are utilized for the "Website Search". This page is accessed by the URL "http://search.dmoz.org/cgi-bin/search?search=cars". The HTML which is returned, is parsed to extract the following five characteristics of each website and storing them into the appropriate array variables— capray—The caption for the website (1901 in FIG. 19)
textray—The textual description for the website (1902 in FIG. 19) linkray—The URL for the website (1903 in FIG. 19)
catray—The category path for the website (1904 in FIG. 19)
catcntray—The total number of matching websites in this category—used for dead-ends (1905 in FIG. 19)

To obtain the next 20 matching websites the URL "http://search.dmoz.org/cgi-bin/search?search=cars&jstart=21" is accessed, and then the URL "http://search.dmoz.org/cgi-bin/search?search=cars&jstart=41" is accessed to obtain the next 20 matching websites of which only the first 10 are parsed since in this example we are assuming "1-50" sites. Note that these arrays (excluding catcntray) are exported to Frame #1 as indicated by 1003a in FIG. 10 and also as represented by the first 5 websites in LINES 1315-1334 in FIG. 13.

Referring to the "Category Search" method, the dmoz.org search results page for the first 25 matching category paths using "cars" as the search query is shown in FIG. 27. This page is accessed by the URL "http://search.dmoz.org/cgi-bin/search?search=cars&morecat=1". The HTML which is returned, is parsed to extract the following two characteristics of each category path and storing them into the appropriate array variables— catray—The category path (2701 in FIG. 27)
catcntray—The total number of matching websites in this category—used for dead-ends (2702 in FIG. 27)

To obtain the next 25 matching websites the URL "http://search.dmoz.org/cgi-bin/search?search=cars&morecat=26" is accessed, and then the URL "http://search.dmoz.org/cgi-bin/search?search=cars&morecat=51" is accessed to obtain the next 25 matching websites, and then the URL "http://search.dmoz.org/cgi-bin/search?search=cars&morecat=76" is accessed to obtain the last 25 matching websites for a total of 100.

Referring only to the catray array for the "Website Search" method—the category path for each website from 1-50 is listed in FIG. 20. First this list is sorted into groups of common parent categories, as shown in Tables 6-11.

TABLE 6 catray(4) = "Regional: Europe: United Kingdom: England: Suffolk: Ipswich: Business and Economy: Shopping: Cars"
catray(18) = "Regional: Europe: United Kingdom: England: Bristol: Business and Economy: Shopping: Cars"
catray(20) = "Regional: Europe: United Kingdom: Recreation and Sports: Sports: Motorsport: Touring Cars"
catray(21) = "Regional: Europe: United Kingdom: England: Bedfordshire: Bedford: Business and Economy: Cars"
catray(22) = "Regional: Europe: United Kingdom: Business and Economy: Shopping: Vehicles: Parts and Accessories"
catray(25) = "Regional: Europe: United Kingdom: England: Suffolk: Ipswich: Business and Economy: Shopping: Cars"
catray(30) = "Regional: Europe: United Kingdom: England: Bristol: Business and Economy: Shopping: Cars"
catray(31) = "Regional: Europe: United Kingdom: Recreation and Sports: Sports: Motorsport: Touring Cars"

TABLE 7 catray(32) = "Regional: Europe: United Kingdom: England: Bedfordshire: Bedford: Business and Economy: Cars"
catray(34) = "Regional: Europe: United Kingdom: England: Suffolk: Ipswich: Business and Economy: Shopping: Cars"
catray(37) = "Regional: Europe: United Kingdom: England: Bristol: Business and Economy: Shopping: Cars"
catray(39) = "Regional: Europe: United Kingdom: England: Suffolk: Ipswich: Business and Economy: Shopping: Cars"
catray(40) = "Regional: Europe: United Kingdom: Recreation and Sports: Sports: Motorsport: Touring Cars"
catray(41) = "Regional: Europe: United Kingdom: England: Bedfordshire: Bedford: Business and Economy: Cars"
catray(43) = "Regional: Europe: United Kingdom: Business and Economy: Shopping: Vehicles: Parts and Accessories:
catray(46) = "Regional: Europe: United Kingdom: England: Bristol: Business and Economy: Shopping: Cars"
catray(48) = "Regional: Europe: United Kingdom: Recreation and Sports: Sports: Motorsport: Touring Cars"
catray(49) = "Regional: Europe: United Kingdom: England: Bedfordshire: Bedford: Business and Economy: Cars"

TABLE 8 catray(7) = "Shopping: Vehicles: Autos: Internet Sales"
catray(8) = "Shopping: Recreation and Hobbies: Models: Cars"
catray(9) = "Shopping: Vehicles: Directories"
catray(10) = "Shopping: Recreation and Hobbies: Models: Slot Cars"
catray(11) = "Shopping: Vehicles: Autos: Parts and Accessories: European Cars"
catray(12) = "Shopping: Vehicles: Autos: Parts and Accessories: American Cars"
catray(16) = "Shopping: Recreation and Hobbies: Models: Radio Control: Cars and Trucks"
catray(26) = "Shopping: Vehicles: Autos: Classic"
catray(27) = "Shopping: Recreation and Hobbies: Models: Slot Cars"
catray(33) = "Shopping: Auctions: Autos"
catray(50) = "Shopping: Sports: Auto Racing"

TABLE 9 catray(1) = "Recreation: Autos: Enthusiasts: Kit Cars"
catray(2) = "Recreation: Models: Scale: Cars"
catray(3) = "Recreation: Models: RC: RC Cars"
catray(13) = "Recreation: Autos: Enthusiasts: Exotic Cars"
catray(29) = "Recreation: Collecting: Toys: Cars and Trucks"
catray(35) = "Recreation: Autos: Enthusiasts: Muscle Cars"
catray(44) = "Recreation: Travel: Reservations: Vehicles: Car Rentals: Exotic Cars"

TABLE 10 catray(5) = "Sports: Auto Racing: Sprint Cars"
catray(6) = "Sports: Auto Racing: Touring Cars"
catray(14) = "Sports: Auto Racing: Drag Racing"
catray(45) = "Sports: Auto Racing: Drag Racing"
catray(15) = "Arts: Music: Bands and Artists: C: Cars, The"
catray(19) = "Arts: Genres: Automotive: Art Cars"

TABLE 11 catray(17) = "Home: Consumer Information: Automobiles: Advocacy and Protection"
catray(23) = "Home: Consumer Information: Automobiles: Purchasing: By Class: Sports Cars"
catray(24) = "Home: Consumer Information: Automobiles: Purchasing: By Class: Luxury Cars"
catray(36) = "Business: Industries: Transportation: Auto Transport"
catray(38) = "Business: Industries: Transportation: Trucking: Truck Transport: Pilot Car Companies"
catray(42) = "Business: Industries: Transportation: Auto Transport"
catray(28) = "Society: Issues: Transportation: Roads, Cars and Trucks: Road Safety"
catray(47) = "Society: Issues: Transportation: Roads, Cars and Trucks"

These groups of websites are used to create Sub link1 (1003*b* in FIG. 10) which is exported to Frame 1 and is represented by the GUI page in FIG. 4. Note that as far as positioning the dots around the ovals, in this embodiment, for clusters with less than 7 dots, the dots are arranged symmetrically around and as close to the oval as possible. For clusters with at least 7 dots, the dots are arranged in a circle, or if needed, two circles around the oval. Note also that a ring is chosen for each cluster that has a diameter slightly larger than the outer diameter of the dots. Note also that the method for positioning the clusters on the web page, is as follows—starting from the upper right corner, the clusters are positioned vertically in a zig-zag pattern, starting with the smallest cluster, "Society", followed by the largest cluster, "Regional", followed by the next 2 largest clusters after "Society", which are "Arts" and "Business", followed by the next smallest cluster after "Regional", which is "Shopping", followed by the next 2 largest clusters after "Business", which are "Home" and "Sports", followed by the next smallest cluster after "Shopping", which is "Recreation", then there are no more clusters left. So the zig-zag pattern is—

1. The Smallest cluster
2. The Largest cluster (of the remaining clusters)
3. The Smallest cluster (of the remaining clusters)
4. The Smallest cluster (of the remaining clusters)
5. Repeat 2-5 until no more clusters remain.

After Sub link1 is exported to Frame #1, each of the clusters is subdivided into further subcategory groups. For instance, referring to the above "Shopping" group of websites—after stripping of the parent category, "Shopping", and sorting this list into groups of common second level category names, you would have the following result shown in Table 12.

TABLE 12 catray(7) = "Vehicles: Autos: Internet Sales"
catray(9) = "Vehicles: Directories"
catray(11) = "Vehicles: Autos: Parts and Accessories: European Cars"
catray(12) = "Vehicles: Autos: Parts and Accessories: American Cars"
catray(26) = "Vehicles: Autos: Classic"
catray(8) = "Recreation and Hobbies: Models: Cars"
catray(10) = "Recreation and Hobbies: Models: Slot Cars"
catray(16) = "Recreation and Hobbies: Models: Radio Control: Cars and Trucks"
catray(27) = "Recreation and Hobbies: Models: Slot Cars"
catray(33) = "Auctions: Autos"
catray(50) = "Sports: Auto Racing"

These groups of websites are used to create Sub link12 (1003*b* in FIG. 10) which is exported to Frame 1 and was previously listed in FIG. 18. This subroutine is represented by the GUI page in FIG. 5. Each one of these second-level groups is further subdivided into third-level, then fourth-level, etc. until every website's category path has reached a "dead end".

Referring only to the catray array for the "Category Search" method—the category path for the first 50 out of 100 matching categories is listed in FIG. 28. Note that the methodology for parsing, and sorting the "Category Search" category list is substantially the same as that used for the "Website Search" method. The method for arranging the circles on the web page are also similar to the arrangement of the rings for the "Website Search" method, without the website icons since they are not applicable to the "Category Search" method. However, it should be understood that the above discussion applies to one or more embodiment of the invention, but is not required for all embodiments of the invention or limiting upon the appended claims.

Figure 29A:
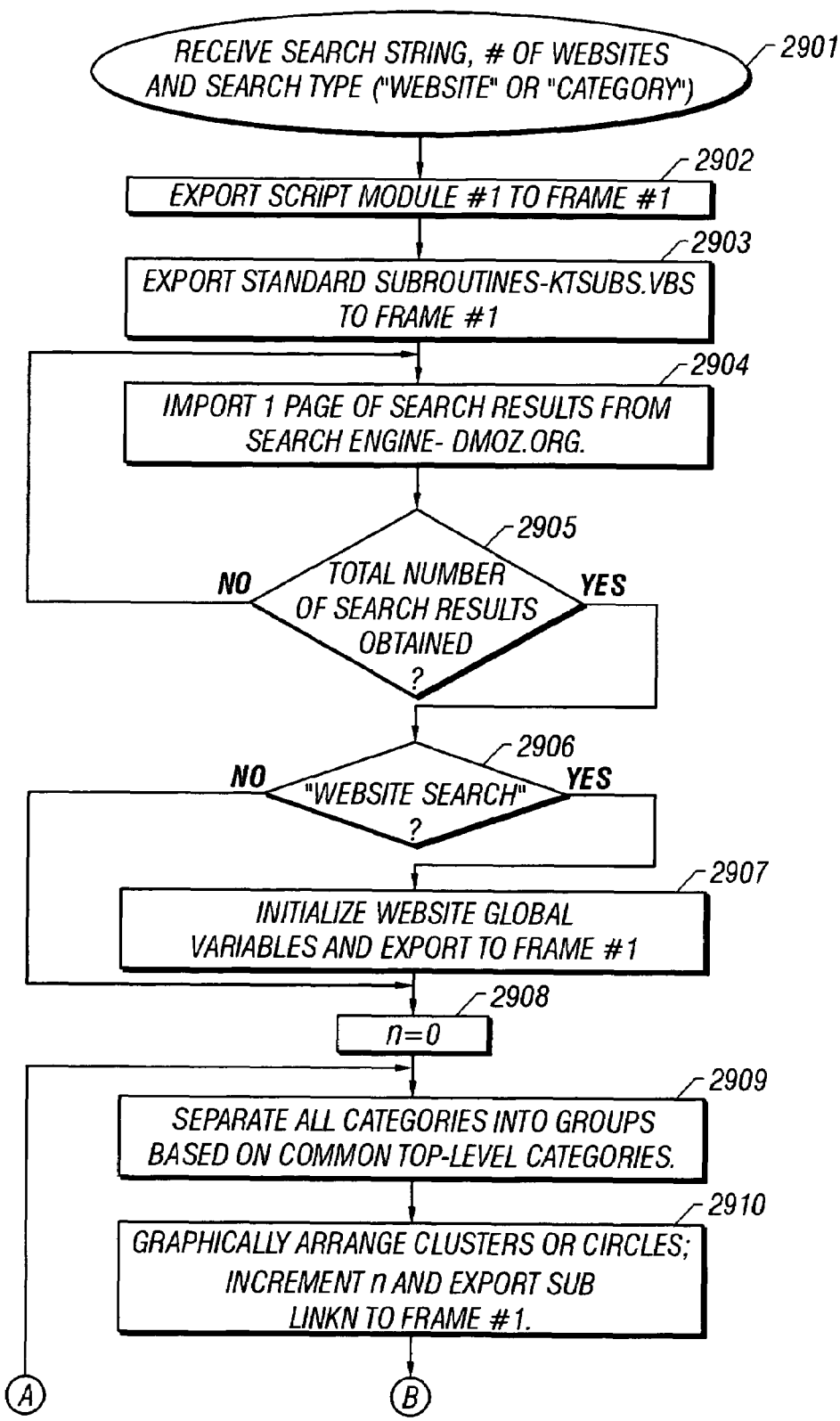
FIG. 29 illustrates an example flow chart.
Figure 29B:
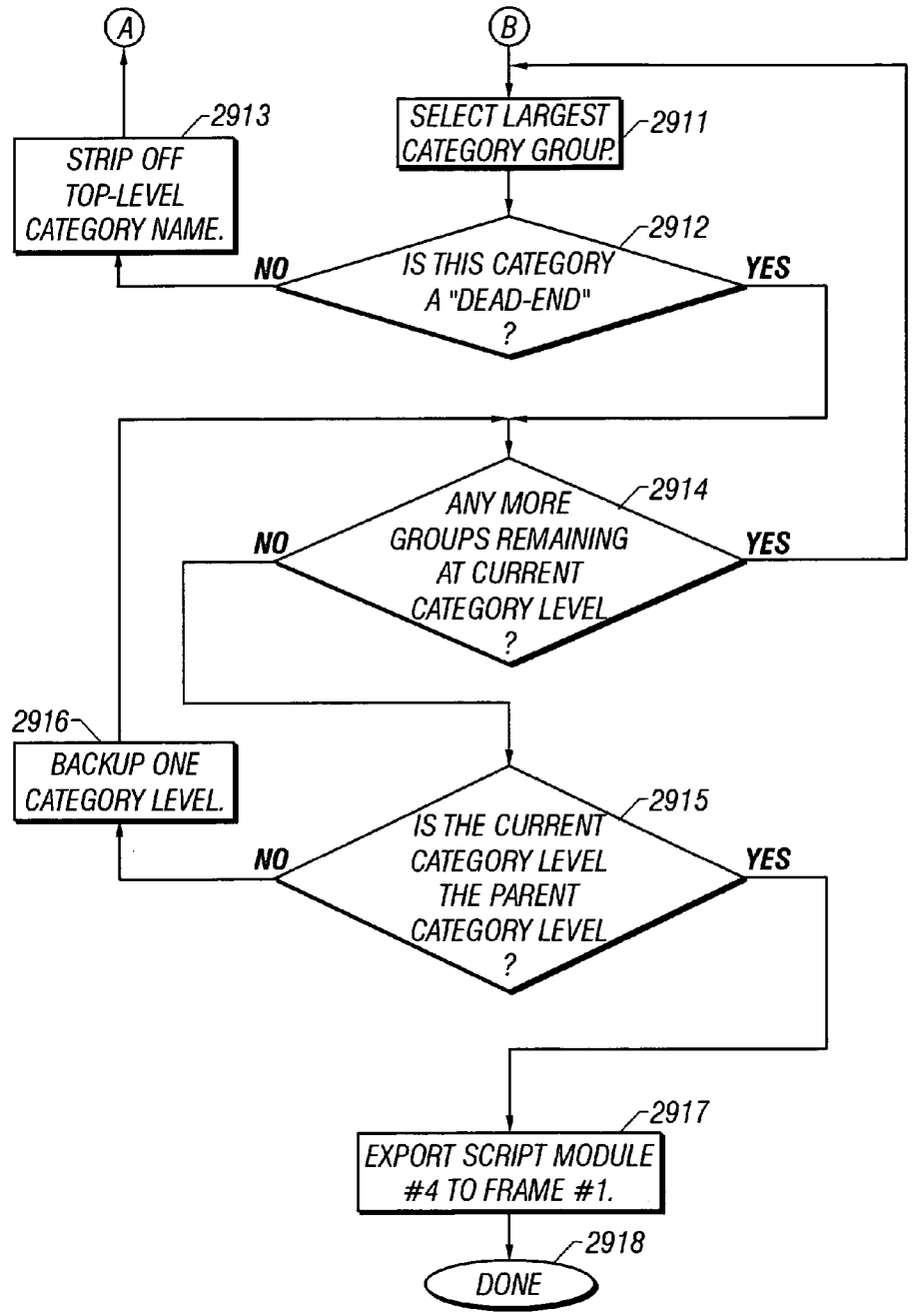

FIG. 29 is a flowchart showing various methods and capabilities of one embodiment of the invention utilizing CGI software and GUI script software as utilized from the server side (104 of FIG.1). In item 2901, the main CGI program Search.exe (ITEM 1 in TABLE 1) receives the search string, the number of websites (1-50 or 1-100), and the search type ("Website Search" or "Category Search") after the user enters a search string, selects the number of websites, and clicks on one of the search buttons in his browser (see 201, 202, 203, and 204 in FIG. 2). In item 2902 the Search.exe program exports script module 1 to Frame 1 (see 1001 in FIG. 10 and LINES 1303-1305 of FIG. 13). In item 2903 Search.exe exports the ktsubs.vbs file (see 1002 in FIG. 10 and LINE 1306 of FIG. 13). In item 2904 Search.exe imports one page of search results from the dmoz.org search engine. As indicated in item 2905, this process is repeated until the total number of required results are obtained. For a "Website Search" this number is either 50 or 100 matching websites depending on the selection of the user (see 202 of FIG. 2). For a "Category Search", in the embodiment of the invention a total of 100 matching categories is the requisite total. Item 2906 and 2907 indicates that in the case of a "Website Search", Search.exe will export the necessary global variables which characterize each matching website (see 103*a* in FIG. 10 and LINES 1307-1334 in FIG. 13).

Item 2908 represents the initialization of the subroutine count, n, which will be used to delineate each subroutine (see 103*b* in FIG. 10) which will define each and every possible GUI/textual user interface page. Item 2909 represents the parsing of the categories of the matching websites ("Website Search") or simply the matching categories ("Category Search"), and then the grouping of the matching categories into common parent-level groups. As indicated in item 2910, after graphically arranging these groups of websites ("Website Search") into clusters or categories ("Category Search") into circles and arranging those clusters or circles on the web page (as described earlier), n is incremented and Sub link1 is exported to Frame #1. As indicated in item 2911, the largest of these groups is selected. As indicated in item 2912, if this group is not a "dead-end" category (further subcategories), then the current top-level category is stripped off, as indicated by item 2913, and the process of items 2909, 2910, 2911, and 2912 are repeated. If the current group is a "dead-end" category (no more subcategories) then if there are more groups remaining at the current category level, as indicated in item 2914, then items 2911 and 2912 are repeated. If there are not anymore remaining groups at the current category level, then if the current category level is not the parent category level (the initial level of categories), as indicated by item 2915, then the current category level is "backed-up" by one category level to the category level which preceded it, as indicated by item 2916, and then item 2914 is repeated. If the current category level is the parent category level then all possible interface pages have been created and their corresponding subroutines have been exported to Frame 1. As indicated by item 2917 the Search.exe program exports script module 4 to Frame 1 (see 1004 in FIG. 10 and FIG. 14). Search.exe finishes execution, as indicated by item 2918.

Figure 33:
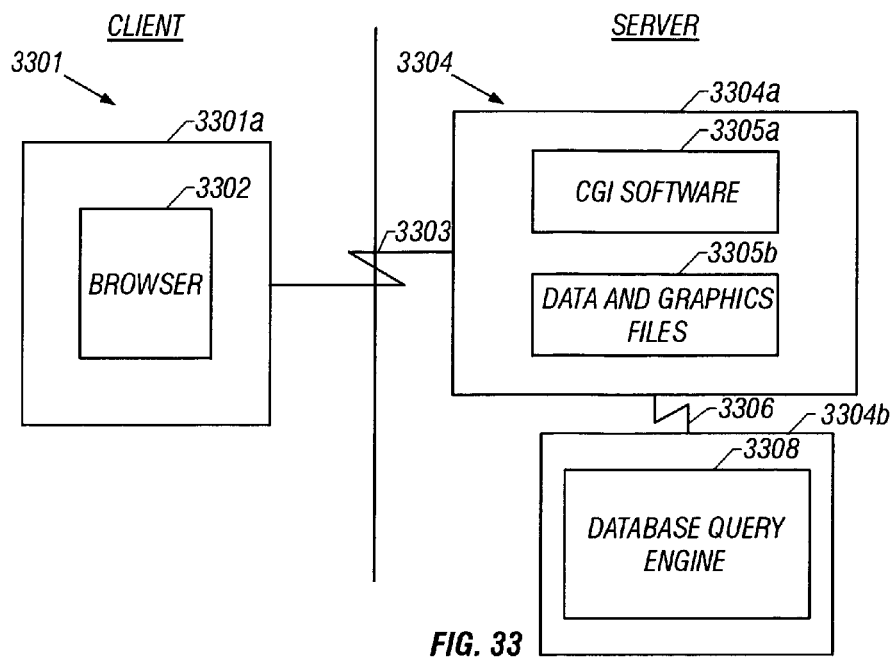
FIG. 33 illustrates an example XML API.

FIG. 30 illustrates a generic XML Application Program Interface to import a list of "n" data elements from a database query engine. This API is useful with both the Implicit and Explicit GUI options of the embodiment shown. FIGS. 31 and 32 illustrate a specific XML API which may be used by the Implicit GUI option and which conserves bandwidth by importing "n" matching leaf nodes as shown in FIG. 31, rather than "n" discrete data elements. The second attribute is a URL to access the particular list of matching data elements which are resident within that leaf node. When that URL is implemented a list of "n" data elements are returned as indicated in FIG. 32. FIG. 33 illustrates an example generic representation of a typical interface with a database query engine versus the particular search engine indicated in FIG. 1.

Figure 16:
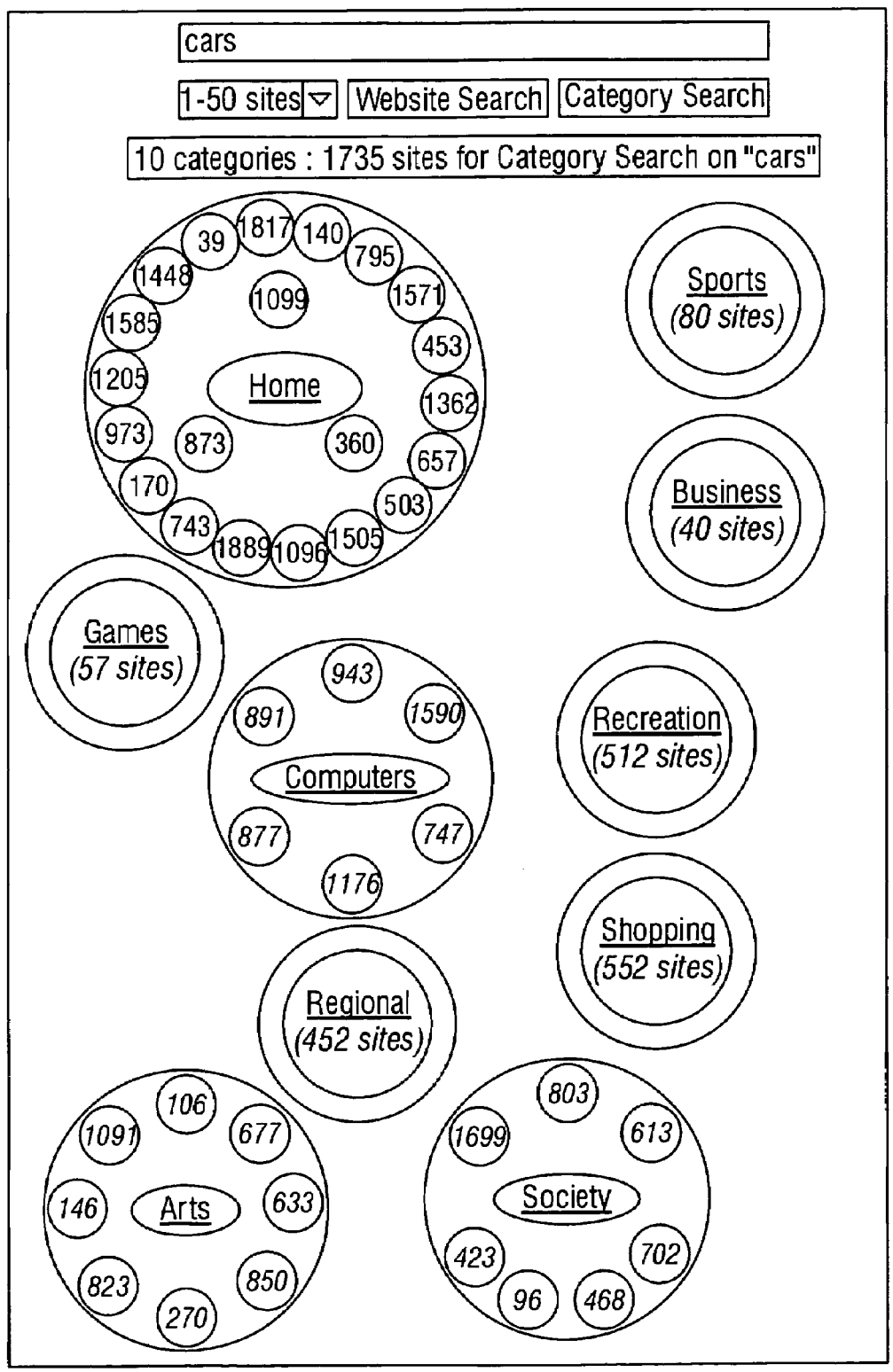
FIG. 16 illustrates an example GUI.
Figure 17:
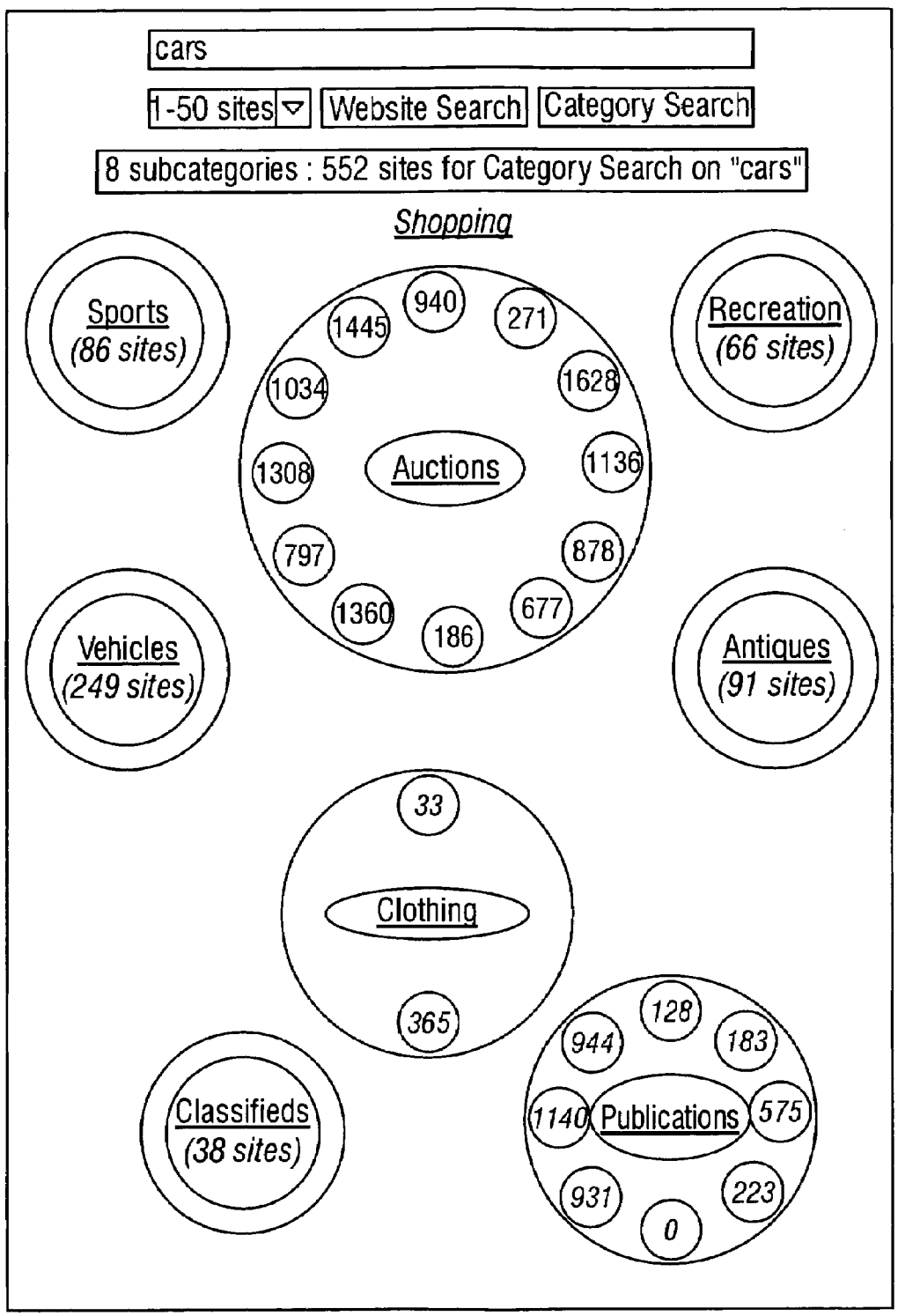
FIG. 17 illustrates an example GUI.
Figure 34:
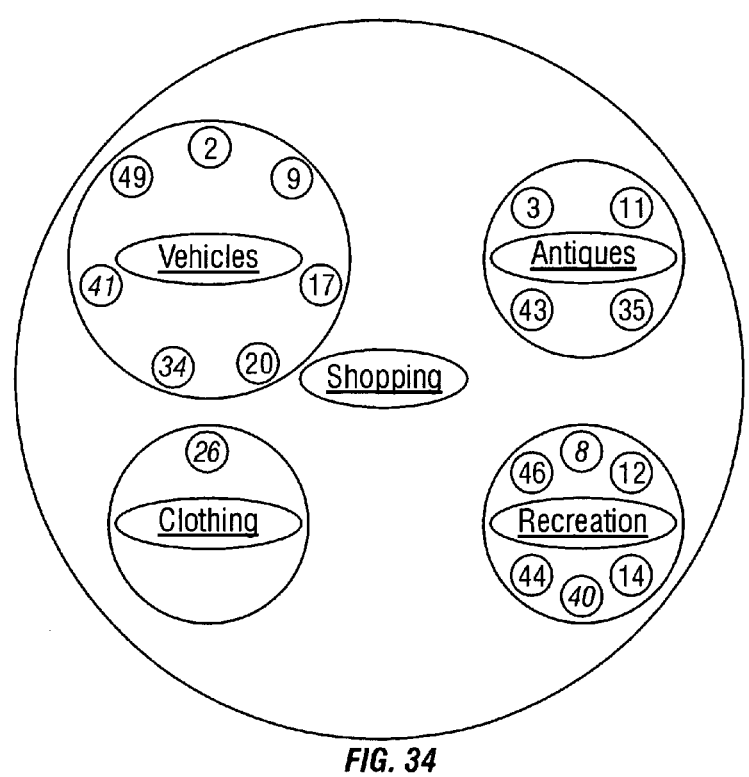
FIG. 34 illustrates two example levels of hierarchy presented with aggregate data.

FIGS. 16 and 17 illustrate a representation of a hybrid GUI option whereby any category within of a category search ("Implicit" GUI) which contain no more than 25 data elements, are implemented by the "Explicit" GUI option. FIG. 16 is a combination of presentation modes shown in FIGS. 4 and 22, while FIG. 17 is a combination of presentation modes shown in FIGS. 5 and 23. FIG. 34 is a particular implementation whereby two levels of the hierarchy are presented at one time while still maintaining the aggregate data element presentation. FIG. 34 represents the "Shopping" mode with it's matching children modes presented with it's circle, along with it's matching aggregate data elements. However, nothing in the preceding exemplary software code descriptions, examples and operation are limiting upon the present invention or the appended claims.

While preferred embodiments of the present invention have been shown and described, modifications thereof can be made by one skilled in the art without departing from the spirit or teachings of this invention. For example, in one embodiment of this invention, a textual, graphical, or aural advertisement may be integrated into each GUI page by adding one more ring (or circle) and placing an advertiser's icon or a brief description of the advertisement inside. By placing the mouse cursor over the description a pop-up window would appear with a more detailed description of the advertisement. By clicking on the description, the advertiser's web page would be downloaded. For another example, in some embodiments, the top 10 ranked website icons could be graphically delineated from the rest of the ranked websites. For another example, the bulbs for the top 10 ranked sites could have black rings surrounding them so that the user could readily distinguish the top 10 websites from the rest of the bulbs.

In yet other embodiments of the invention, for example, the website descriptions could be downloaded from the server separately from the rest of the script software in Frame 1 and all of the content necessary to render all of the GUI pages, except for the descriptions of each website, are downloaded into Frame 1. Note that these descriptions are the text displayed in the pop-up window whenever the mouse cursor is positioned over a website icon. After all of the subroutines for rendering each and every GUI is downloaded into Frame 1, the first GUI interface (eg. FIG. 4) is rendered in Frame 2 just as before. Each website icon could, for example, be white with a colored ring to indicate that the descriptions for each website is not yet available for viewing. If a user were to position the mouse cursor over such an icon, a pop-up window would indicate "Still downloading description" or something to that effect. Also, until all website descriptions are downloaded, the "TEXT" button would be inactive. Immediately upon rendering the first GUI page, the downloading of all of the website descriptions could begin downloading into a fourth frame, Frame 4. After each website description is downloaded the corresponding website icon would turn into the standard solid colored bulb to indicate that the description for that website is available. If the user were to position the mouse cursor over such a website icon, a pop-up window would appear with the corresponding textual description displayed. Note that in this embodiment, while the website descriptions are downloading, the user would still be able to navigate the GUI page(s) in all other aspects, excluding only the viewing of website descriptions (via pop-up windows) not yet downloaded and the linking to the corresponding website page.

Preferred embodiments of the present invention thus offer advantages over the prior art and are well adapted to carry out one or more of the objects of the invention. However, the present invention does not require each of the acts and components described above. Any one or more of the above features, acts, steps, processes or components may be employed in any suitable configuration without inclusion of other such features, acts, steps, processes or components. Further, the present invention is not limited to the above-described embodiments and methods of operation. Additional features, capabilities, components, functions, methods, uses and applications may be included.

The methods described above and any other methods which may fall within the scope of any of the appended claims can be performed in any desired suitable order and are not necessarily limited to the sequence described herein or as may be listed in any of the appended claims. Moreover, the methods of the present invention do not require use of the particular components or embodiments shown and described in the present specification, but are equally applicable with any other suitable structure, form and configuration of components.

Accordingly, while preferred embodiments of this invention have been shown and described, many variations, modifications and/or changes of the system, apparatus and methods of the present invention, such as in the components, details of construction and operation, arrangement of parts and/or methods of use, are possible, contemplated by the patentee, within the scope of the appended claims, and may be made and used by one of ordinary skill in the art without departing from the spirit or teachings of the invention and scope of appended claims. Thus, all matter herein set forth or shown in the accompanying drawings should be interpreted as illustrative and not limiting, and the scope of the invention and the appended claims is not limited to the embodiments described and shown herein.

The invention claimed is:

1. A computer-implemented method of displaying, on a monitor, screen or other apparatus, a plurality of search results from at least one search of at least one data source and allowing a user to narrow or navigate through such search results, the method comprising:
  after at least one search request query is input to initiate at least one search, in a view provided on the monitor, screen or other apparatus,
    showing a distinct image for each of the plurality of search results, wherein the distinct images are not shown having graphical links between them and do not overlap one another,
    displaying at least some of the distinct images in at least one distinct initial grouping based upon membership in at least one such initial grouping, and
    providing a distinct group identifier for each respective initial grouping;
  upon selection of at least one initial grouping, transforming the view of the monitor, screen or other apparatus by regrouping at least some of the distinct images of the at least one selected initial grouping in distinct new groupings based upon membership in at least one such new grouping, and providing a new group identifier for each respective new grouping, wherein the total number of distinct images displayed in the new groupings is not greater than the number of distinct images displayed in the at least one selected initial grouping; and
  thereafter, upon selection of at least one such new grouping, further transforming the view of the monitor, screen or other apparatus by again regrouping at least some of the distinct images of such selected at least one grouping in distinct different groupings based upon membership in at least one such different grouping, and providing a new group identifier for each respective different grouping, wherein the total number of distinct images displayed in the different groupings is not greater than the number of distinct images displayed in the at least one selected new grouping;
  whereby the search results are displayed and arranged, and can be rearranged and narrowed, to assist at least one user in navigating through and narrowing the search results.

2. The method of claim 1 further including each depicted search result image including at least one among at least one icon, symbol, graphical representation, picture and photograph.

3. The method of claim 2 further including displaying textual information along with each displayed search result image, such textual information relating to the associated search result, and wherein each group identifier includes text.

4. The method of claim 1 further including, for each displayed search result, indicating its rank relative to other search results.

5. The method of claim 4 further including entering a textual query into a query field to input at least one search request query.

6. The method of claim 1 further including providing a geometric shape for each distinct image and providing a geometric shape for each grouping of distinct images.

7. The method of claim 1 wherein the geometric shape of each distinct image is at least substantially circular and the geometric shape of each grouping is at least substantially circular.

8. The method of claim 1 wherein a grouping may be selected by a user clicking a pointing device over a demarcated location, touch activation, voice activation or selecting one or more keys on a device.

9. The method of claim 8 further including each group identifier serving as a link to the next level groupings of images for the search results represented thereby.

10. The method of claim 8 wherein the at least one data source has a taxonomic structure, wherein each search result has an implied node path delineating the path within the taxonomic structure that leads to at least one node in the at least one data source where such search result resides, wherein membership in a grouping is based upon having a common node in the respective node paths of the members of such grouping.

11. The method of claim 8 further including displaying up to thirty distinct images in at least one distinct initial groupings without the necessity of web page turning or substantial web page scrolling to view them.

12. A computer-implemented method of displaying, on a monitor, screen or other apparatus, data elements resulting from a search of at least one data source and allowing a user to narrow or navigate through such search results, the data elements being accessible via at least one taxonomic index, the at least one taxonomic index having multiple nodes at multiple levels, the path in the taxonomic index that leads to each data element being referred to as that data element's implied category path, each implied category path providing at least two categories, each consecutively listed category in an implied category path representing a different node at a lower level in the taxonomic index, the method comprising:
  after at least one search request query is input to initiate at least one search, in a view provided on the monitor, screen or other apparatus, displaying at least one category from the implied category paths of each of a plurality of data elements;

upon a user selecting at least one displayed category,
providing a distinct representation of each among at least some of the data elements having the selected category in its implied category path,
organizing such data element representations in distinct groups, each distinct group including data elements having a common lower-level category in their respective implied category paths, and
displaying such lower-level categories; and
upon a user selecting at least one displayed lower-level category, regrouping at least some of the data element representations associated with the selected lower-level category in new groups, each new group including data elements having another common even lower-level category in their respective implied category paths, and displaying such lower-level categories, wherein the total number of data element representations displayed in the new groups is not greater than the number of data element representations displayed in the group(s) associated with the at least one selected category,
wherein the data element representations are not shown having graphical links between them and do not overlap one another, and
whereby the selection of a displayed category will show data elements associated with such category in the context of lower-level categories, and
whereby the search results are displayed and arranged, and can be rearranged and narrowed, to assist at least one user in navigating through and narrowing the search results.

13. The method of claim 12 further including color coding the groups of displayed data element representations.

14. The method of claim 12 further including continuing the regrouping of data element representations for multiple additional levels of the taxonomic index based upon the implied category paths of the search results represented thereby.

15. The method of claim 12 wherein up to one hundred data element representations may be displayed at once.

16. The method of claim 12 further including, for each displayed search result, indicating its rank relative to other search results.

17. A computer-implemented method of displaying, on a monitor screen or other apparatus, search results of data elements residing in at least one data source and allowing a user to narrow or navigate through such search results, the at least one data source having multiple hierarchically-arranged levels with at least one node at each level, each node having a name identifying such node, each data element residing in the at least one data source at least one node, such node being the designated end-node for such data element and any other data elements that reside there, each data element having at least one implied node path representing the path of nodes through the hierarchically-arranged levels of the at least one data source that leads to the end-node of such data element, each node path listing its respective nodes in descending order through the hierarchically-arranged levels of the at least one data source with the last-listed node being the end node for the associated data element, the method comprising:
after at least one search request query is input to initiate at least one search,
displaying, on the monitor, screen or other apparatus, a plurality of data elements from the search results in separate initial groups on a first web page, each such grouping including data elements having a common non-end node included in their respective node paths, wherein the displayed data elements are grouped together based upon such common non-end nodes,
providing the associated name for each such non-end node for each displayed initial group,
providing access to each displayed data element, and
providing the ability to select at least one initial group; and
upon selection of an initial group,
displaying at least some of the data element members of such initial group in distinct first sub-groups, each such grouping including data elements having another common non-end node at a level in their respective node paths that is lower than the node associated with the initial grouping thereof, whereby the displayed data elements are grouped together based upon such further common non-end nodes, wherein the total number of data elements displayed in such first sub-groups is not greater than the number of data elements displayed in the selected initial group, and
providing the associated name for each such non end-node for each displayed first sub-group, and providing access to each displayed data element,
wherein displayed data elements are not shown having graphical links between them and do not overlap one another, and whereby the search results are displayed and arranged, and can be rearranged and narrowed, to assist at least one user in navigating through and narrowing the search results.

18. The method of claim 17 further including
providing the ability to select at least one first sub-group; and
upon selection of a first sub-group,
displaying at least some of the data element members of such group in distinct second sub-groups, each such grouping including data elements having a another common node at a level in their respective node paths that is lower than the node associated with the first sub-grouping thereof,
providing the associated name for each such common node for each displayed second sub-group, and
providing access to each displayed data element.

19. The method of claim 18 wherein access is provided to each displayed data element by at least one among a user clicking a pointing device over a demarcated location, touching the monitor, screen or other viewable area, voice activation or selecting one or more keys on an associated keyboard or keypad.

* * * * *